(12) United States Patent
Bai et al.

(10) Patent No.: US 10,713,203 B2
(45) Date of Patent: Jul. 14, 2020

(54) DYNAMIC PARTITION OF PCIE DISK ARRAYS BASED ON SOFTWARE CONFIGURATION / POLICY DISTRIBUTION

(71) Applicant: CISCO TECHNOLOGY, INC., San Jose, CA (US)

(72) Inventors: Yun Bai, Shanghai (CN); Mengshi Li, Shanghai (CN); Yang Sun, Zhejiang (CN); Min Wang, Shanghai (CN); Yepeng Chen, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 363 days.

(21) Appl. No.: 15/445,662

(22) Filed: Feb. 28, 2017

(65) Prior Publication Data
US 2018/0246833 A1    Aug. 30, 2018

(51) Int. Cl.
*G06F 11/00* (2006.01)
*G06F 13/40* (2006.01)
(Continued)

(52) U.S. Cl.
CPC .......... *G06F 13/4022* (2013.01); *G06F 3/061* (2013.01); *G06F 3/0617* (2013.01);
(Continued)

(58) Field of Classification Search
CPC ............... G06F 11/2007; G06F 11/203; G06F 11/2033; G06F 13/4022; G06F 3/0635;
(Continued)

(56) References Cited

U.S. PATENT DOCUMENTS 4,688,695 A    8/1987    Hirohata
5,263,003 A    11/1993    Cowles et al.
(Continued)

FOREIGN PATENT DOCUMENTS

TW          1566104      1/2017
WO    WO 2016/003408    1/2016

OTHER PUBLICATIONS

International Search Report and Written Opinion, from the International Searching Authority, dated Apr. 25, 2018, 13 pages, for the corresponding International Application PCT/US2018/017956.
(Continued)

*Primary Examiner* — Elmira Mehrmanesh
(74) *Attorney, Agent, or Firm* — Polsinelli PC

(57) ABSTRACT

This disclosure relates to methods and systems for dynamically partitioning of PCIe disk arrays based on software configuration/policy distribution. In one embodiment, at least one PCIe switch has an input port operatively connected to a respective CPU and at least one output port. A multiplexer is connected between the output port(s) of the at least one PCIe switch and a PCIe disk array, for example an NVMe SSD, and is configured to connect the PCIe disk array in a first configuration to a single PCIe switch in either one-x4 port or two x2 port mode, or in a second configuration to two PCIe switches in x2 port mode. The multiplexer can dynamically switch between the first configuration and the second configuration on the fly. Switching can occur, for example, in response to a hot-swap of an NVMe SSD or a policy change.

19 Claims, 11 Drawing Sheets

(51) Int. Cl.
  *G06F 13/42* (2006.01)
  *G06F 3/06* (2006.01)
  *G06F 11/20* (2006.01)
  *G06F 13/38* (2006.01)

(52) U.S. Cl.
  CPC .......... *G06F 3/0619* (2013.01); *G06F 3/0635* (2013.01); *G06F 3/0658* (2013.01); *G06F 3/0665* (2013.01); *G06F 3/0688* (2013.01); *G06F 3/0689* (2013.01); *G06F 11/203* (2013.01); *G06F 11/2007* (2013.01); *G06F 11/2033* (2013.01); *G06F 13/38* (2013.01); *G06F 13/4282* (2013.01)

(58) Field of Classification Search
  CPC .... G06F 3/0658; G06F 3/0665; G06F 3/0688; G06F 3/0689
  See application file for complete search history.

(56) References Cited

U.S. PATENT DOCUMENTS

| | | |
|---|---|---|
| 5,339,445 A | 8/1994 | Gasztonyi |
| 5,430,859 A | 7/1995 | Norman et al. |
| 5,457,746 A | 10/1995 | Dolphin |
| 5,535,336 A | 7/1996 | Smith et al. |
| 5,588,012 A | 12/1996 | Oizumi |
| 5,617,421 A | 4/1997 | Chin et al. |
| 5,680,579 A | 10/1997 | Young et al. |
| 5,690,194 A | 11/1997 | Parker et al. |
| 5,740,171 A | 4/1998 | Mazzola et al. |
| 5,742,604 A | 4/1998 | Edsall et al. |
| 5,764,636 A | 6/1998 | Edsall |
| 5,809,285 A | 9/1998 | Hilland |
| 5,812,814 A | 9/1998 | Sukegawa |
| 5,812,950 A | 9/1998 | Tom |
| 5,838,970 A | 11/1998 | Thomas |
| 5,999,930 A | 12/1999 | Wolff |
| 6,035,105 A | 3/2000 | McCloghrie et al. |
| 6,043,777 A | 3/2000 | Bergman et al. |
| 6,101,497 A | 8/2000 | Ofek |
| 6,148,414 A | 11/2000 | Brown et al. |
| 6,185,203 B1 | 2/2001 | Berman |
| 6,188,694 B1 | 2/2001 | Fine et al. |
| 6,202,135 B1 | 3/2001 | Kedem et al. |
| 6,208,649 B1 | 3/2001 | Kloth |
| 6,209,059 B1 | 3/2001 | Ofer et al. |
| 6,219,699 B1 | 4/2001 | McCloghrie et al. |
| 6,219,753 B1 | 4/2001 | Richardson |
| 6,223,250 B1 | 4/2001 | Yokono |
| 6,226,771 B1 | 5/2001 | Hilla et al. |
| 6,260,120 B1 | 7/2001 | Blumenau et al. |
| 6,266,705 B1 | 7/2001 | Ullum et al. |
| 6,269,381 B1 | 7/2001 | St. Pierre et al. |
| 6,269,431 B1 | 7/2001 | Dunham |
| 6,295,575 B1 | 9/2001 | Blumenau et al. |
| 6,400,730 B1 | 6/2002 | Latif et al. |
| 6,408,406 B1 | 6/2002 | Parris |
| 6,542,909 B1 | 4/2003 | Tamer et al. |
| 6,542,961 B1 | 4/2003 | Matsunami et al. |
| 6,553,390 B1 | 4/2003 | Gross et al. |
| 6,564,252 B1 | 5/2003 | Hickman et al. |
| 6,647,474 B2 | 11/2003 | Yanai et al. |
| 6,675,258 B1 | 1/2004 | Bramhall et al. |
| 6,683,883 B1 | 1/2004 | Czeiger et al. |
| 6,694,413 B1 | 2/2004 | Mimatsu et al. |
| 6,708,227 B1 | 3/2004 | Cabrera et al. |
| 6,715,007 B1 | 3/2004 | Williams et al. |
| 6,728,791 B1 | 4/2004 | Young |
| 6,772,231 B2 | 8/2004 | Reuter et al. |
| 6,820,099 B1 | 11/2004 | Huber et al. |
| 6,847,647 B1 | 1/2005 | Wrenn |
| 6,848,759 B2 | 2/2005 | Doornbos et al. |
| 6,850,955 B2 | 2/2005 | Sonoda et al. |
| 6,876,656 B2 | 4/2005 | Brewer et al. |
| 6,880,062 B1 | 4/2005 | Ibrahim et al. |
| 6,898,670 B2 | 5/2005 | Nahum |
| 6,907,419 B1 | 6/2005 | Pesola et al. |
| 6,912,668 B1 | 6/2005 | Brown et al. |
| 6,952,734 B1 | 10/2005 | Gunlock et al. |
| 6,976,090 B2 | 12/2005 | Ben-Shaul et al. |
| 6,978,300 B1 | 12/2005 | Beukema et al. |
| 6,983,303 B2 | 1/2006 | Pellegrino et al. |
| 6,986,015 B2 | 1/2006 | Testardi |
| 6,986,069 B2 | 1/2006 | Oehler et al. |
| 7,051,056 B2 | 5/2006 | Rodriguez-Rivera et al. |
| 7,069,465 B2 | 6/2006 | Chu et al. |
| 7,073,017 B2 | 7/2006 | Yamamoto |
| 7,108,339 B2 | 9/2006 | Berger |
| 7,149,858 B1 | 12/2006 | Kiselev |
| 7,171,514 B2 | 1/2007 | Coronado et al. |
| 7,171,668 B2 | 1/2007 | Molloy et al. |
| 7,174,354 B2 | 2/2007 | Andreasson |
| 7,200,144 B2 | 4/2007 | Terrell et al. |
| 7,222,255 B1 | 5/2007 | Claessens et al. |
| 7,237,045 B2 | 6/2007 | Beckmann et al. |
| 7,240,188 B2 | 7/2007 | Takata et al. |
| 7,246,260 B2 | 7/2007 | Brown et al. |
| 7,266,718 B2 | 9/2007 | Idei et al. |
| 7,269,168 B2 | 9/2007 | Roy et al. |
| 7,277,431 B2 | 10/2007 | Walter et al. |
| 7,277,948 B2 | 10/2007 | Igarashi et al. |
| 7,305,658 B1 | 12/2007 | Hamilton et al. |
| 7,328,434 B2 | 2/2008 | Swanson et al. |
| 7,340,555 B2 | 3/2008 | Ashmore et al. |
| 7,346,751 B2 | 3/2008 | Prahlad et al. |
| 7,352,706 B2 | 4/2008 | Klotz et al. |
| 7,353,305 B2 | 4/2008 | Pangal et al. |
| 7,359,321 B1 | 4/2008 | Sindhu et al. |
| 7,363,417 B1 * | 4/2008 | Ngai ............... G06F 13/4022 710/305 |
| 7,383,381 B1 | 6/2008 | Faulkner et al. |
| 7,403,987 B1 | 7/2008 | Marinelli et al. |
| 7,433,326 B2 | 10/2008 | Desai et al. |
| 7,433,948 B2 | 10/2008 | Edsall |
| 7,434,105 B1 | 10/2008 | Rodriguez-Rivera et al. |
| 7,441,154 B2 | 10/2008 | Klotz et al. |
| 7,447,839 B2 | 11/2008 | Uppala |
| 7,487,321 B2 | 2/2009 | Muthiah et al. |
| 7,500,053 B1 | 3/2009 | Kavuri et al. |
| 7,512,744 B2 | 3/2009 | Banga et al. |
| 7,542,681 B2 | 6/2009 | Cornell et al. |
| 7,558,872 B1 | 7/2009 | Senevirathne et al. |
| 7,587,570 B2 | 9/2009 | Sarkar et al. |
| 7,631,023 B1 | 12/2009 | Kaiser et al. |
| 7,643,505 B1 | 1/2010 | Colloff |
| 7,654,625 B2 | 2/2010 | Amann et al. |
| 7,657,796 B1 | 2/2010 | Kaiser et al. |
| 7,668,981 B1 | 2/2010 | Nagineni et al. |
| 7,669,071 B2 | 2/2010 | Cochran et al. |
| 7,689,384 B1 | 3/2010 | Becker |
| 7,694,092 B2 | 4/2010 | Mizuno |
| 7,697,554 B1 | 4/2010 | Ofer et al. |
| 7,706,303 B2 | 4/2010 | Bose et al. |
| 7,707,481 B2 | 4/2010 | Kirschner et al. |
| 7,716,648 B2 | 5/2010 | Vaidyanathan et al. |
| 7,752,360 B2 | 7/2010 | Galles |
| 7,757,059 B1 | 7/2010 | Ofer et al. |
| 7,774,329 B1 | 8/2010 | Peddy et al. |
| 7,774,839 B2 | 8/2010 | Nazzal |
| 7,793,138 B2 | 9/2010 | Rastogi et al. |
| 7,840,730 B2 | 11/2010 | D'Amato et al. |
| 7,843,906 B1 | 11/2010 | Chidambaram et al. |
| 7,895,428 B2 | 2/2011 | Boland, IV et al. |
| 7,904,599 B1 | 3/2011 | Bennett |
| 7,930,494 B1 | 4/2011 | Goheer et al. |
| 7,975,175 B2 | 7/2011 | Votta et al. |
| 7,979,670 B2 | 7/2011 | Saliba et al. |
| 7,984,259 B1 | 7/2011 | English |
| 8,031,703 B2 | 10/2011 | Gottumukkula et al. |
| 8,032,621 B1 | 10/2011 | Upalekar et al. |
| 8,051,197 B2 | 11/2011 | Mullendore et al. |
| 8,086,755 B2 | 12/2011 | Duffy, IV et al. |
| 8,161,134 B2 | 4/2012 | Mishra et al. |

(56) References Cited

U.S. PATENT DOCUMENTS

| | | |
|---|---|---|
| 8,196,018 B2 | 6/2012 | Forhan et al. |
| 8,205,951 B2 | 6/2012 | Boks |
| 8,218,538 B1 | 7/2012 | Chidambaram et al. |
| 8,230,066 B2 | 7/2012 | Heil |
| 8,234,377 B2 | 7/2012 | Cohn |
| 8,266,238 B2 | 9/2012 | Zimmer et al. |
| 8,272,104 B2 | 9/2012 | Chen et al. |
| 8,274,993 B2 | 9/2012 | Sharma et al. |
| 8,290,919 B1 | 10/2012 | Kelly et al. |
| 8,297,722 B2 | 10/2012 | Chambers et al. |
| 8,301,746 B2 | 10/2012 | Head et al. |
| 8,335,231 B2 | 12/2012 | Kloth et al. |
| 8,341,121 B1 | 12/2012 | Claudatos et al. |
| 8,345,692 B2 | 1/2013 | Smith |
| 8,352,941 B1 | 1/2013 | Protopopov et al. |
| 8,392,760 B2 | 3/2013 | Kandula et al. |
| 8,442,059 B1 | 5/2013 | de la Iglesia et al. |
| 8,479,211 B1 | 7/2013 | Marshall et al. |
| 8,495,356 B2 | 7/2013 | Ashok et al. |
| 8,514,868 B2 | 8/2013 | Hill |
| 8,532,108 B2 | 9/2013 | Li et al. |
| 8,560,663 B2 | 10/2013 | Baucke et al. |
| 8,619,599 B1 | 12/2013 | Even |
| 8,626,891 B2 | 1/2014 | Guru et al. |
| 8,630,983 B2 | 1/2014 | Sengupta et al. |
| 8,660,129 B1 | 2/2014 | Brendel et al. |
| 8,661,299 B1 | 2/2014 | Ip |
| 8,677,485 B2 | 3/2014 | Sharma et al. |
| 8,683,296 B2 | 3/2014 | Anderson et al. |
| 8,706,772 B2 | 4/2014 | Hartig et al. |
| 8,719,804 B2 | 5/2014 | Jain |
| 8,725,854 B2 | 5/2014 | Edsall |
| 8,768,981 B1 | 7/2014 | Milne et al. |
| 8,775,773 B2 | 7/2014 | Acharya et al. |
| 8,793,372 B2 | 7/2014 | Ashok et al. |
| 8,805,918 B1 | 8/2014 | Chandrasekaran et al. |
| 8,805,951 B1 | 8/2014 | Faibish et al. |
| 8,832,330 B1 | 9/2014 | Lancaster |
| 8,855,116 B2 | 10/2014 | Rosset et al. |
| 8,856,339 B2 | 10/2014 | Mestery et al. |
| 8,868,474 B2 | 10/2014 | Leung et al. |
| 8,887,286 B2 | 11/2014 | Dupont et al. |
| 8,898,385 B2 | 11/2014 | Jayaraman et al. |
| 8,909,928 B2 | 12/2014 | Ahmad et al. |
| 8,918,510 B2 | 12/2014 | Gmach et al. |
| 8,918,586 B1 | 12/2014 | Todd et al. |
| 8,924,720 B2 | 12/2014 | Raghuram et al. |
| 8,930,747 B2 | 1/2015 | Levijarvi et al. |
| 8,935,500 B1 | 1/2015 | Gulati et al. |
| 8,949,677 B1 | 2/2015 | Brundage et al. |
| 8,996,837 B1 | 3/2015 | Bono et al. |
| 9,003,086 B1 | 4/2015 | Schuller et al. |
| 9,007,922 B1 | 4/2015 | Mittal et al. |
| 9,009,427 B2 | 4/2015 | Sharma et al. |
| 9,009,704 B2 | 4/2015 | McGrath et al. |
| 9,075,638 B2 | 7/2015 | Barnett et al. |
| 9,141,554 B1 | 9/2015 | Candelaria |
| 9,141,785 B2 | 9/2015 | Mukkara et al. |
| 9,164,795 B1 | 10/2015 | Vincent |
| 9,176,677 B1 | 11/2015 | Fradkin et al. |
| 9,201,704 B2 | 12/2015 | Chang et al. |
| 9,203,784 B2 | 12/2015 | Chang et al. |
| 9,207,882 B2 | 12/2015 | Rosset et al. |
| 9,207,929 B2 | 12/2015 | Katsura |
| 9,213,612 B2 | 12/2015 | Candelaria |
| 9,223,564 B2 | 12/2015 | Munireddy et al. |
| 9,223,634 B2 | 12/2015 | Chang et al. |
| 9,244,761 B2 | 1/2016 | Yekhanin et al. |
| 9,250,969 B2 | 2/2016 | Lager-Cavilla et al. |
| 9,264,494 B2 | 2/2016 | Factor et al. |
| 9,270,754 B2 | 2/2016 | Iyengar et al. |
| 9,280,487 B2 | 3/2016 | Candelaria |
| 9,292,460 B2 * | 3/2016 | Freking .............. G06F 9/4411 |
| 9,292,465 B2 * | 3/2016 | Trivedi .............. G06F 13/42 |
| 9,304,815 B1 | 4/2016 | Vasanth et al. |
| 9,313,048 B2 | 4/2016 | Chang et al. |
| 9,374,270 B2 | 6/2016 | Nakil et al. |
| 9,378,060 B2 | 6/2016 | Jansson et al. |
| 9,396,251 B1 | 7/2016 | Boudreau et al. |
| 9,448,877 B2 | 9/2016 | Candelaria |
| 9,471,348 B2 | 10/2016 | Zuo et al. |
| 9,501,473 B1 | 11/2016 | Kong et al. |
| 9,503,523 B2 | 11/2016 | Rosset et al. |
| 9,565,110 B2 | 2/2017 | Mullendore et al. |
| 9,575,828 B2 | 2/2017 | Agarwal et al. |
| 9,582,366 B2 * | 2/2017 | Arroyo .............. G06F 11/2247 |
| 9,582,377 B1 | 2/2017 | Dhoolam et al. |
| 9,614,763 B2 | 4/2017 | Dong et al. |
| 9,658,868 B2 | 5/2017 | Hill |
| 9,658,876 B2 | 5/2017 | Chang et al. |
| 9,733,868 B2 | 8/2017 | Chandrasekaran et al. |
| 9,763,518 B2 | 9/2017 | Charest et al. |
| 9,830,240 B2 | 11/2017 | George et al. |
| 9,842,075 B1 * | 12/2017 | Davis .............. G06F 13/385 |
| 9,853,873 B2 | 12/2017 | Dasu et al. |
| 2002/0049980 A1 | 4/2002 | Hoang |
| 2002/0053009 A1 | 5/2002 | Selkirk et al. |
| 2002/0073276 A1 | 6/2002 | Howard et al. |
| 2002/0083120 A1 | 6/2002 | Soltis |
| 2002/0095547 A1 | 7/2002 | Watanabe et al. |
| 2002/0103889 A1 | 8/2002 | Markson et al. |
| 2002/0103943 A1 | 8/2002 | Lo et al. |
| 2002/0112113 A1 | 8/2002 | Karpoff et al. |
| 2002/0120741 A1 | 8/2002 | Webb et al. |
| 2002/0138675 A1 | 9/2002 | Mann |
| 2002/0156971 A1 | 10/2002 | Jones et al. |
| 2003/0023885 A1 | 1/2003 | Potter et al. |
| 2003/0026267 A1 | 2/2003 | Oberman et al. |
| 2003/0055933 A1 | 3/2003 | Ishizaki et al. |
| 2003/0056126 A1 | 3/2003 | O'Connor et al. |
| 2003/0065986 A1 | 4/2003 | Fraenkel et al. |
| 2003/0084359 A1 | 5/2003 | Bresniker et al. |
| 2003/0118053 A1 | 6/2003 | Edsall et al. |
| 2003/0131105 A1 | 7/2003 | Czeiger et al. |
| 2003/0131165 A1 | 7/2003 | Asano et al. |
| 2003/0131182 A1 | 7/2003 | Kumar et al. |
| 2003/0140134 A1 | 7/2003 | Swanson et al. |
| 2003/0140210 A1 | 7/2003 | Testardi |
| 2003/0149763 A1 | 8/2003 | Heitman et al. |
| 2003/0154271 A1 | 8/2003 | Baldwin et al. |
| 2003/0159058 A1 | 8/2003 | Eguchi et al. |
| 2003/0174725 A1 | 9/2003 | Shankar |
| 2003/0189395 A1 | 10/2003 | Doornbos et al. |
| 2003/0210686 A1 | 11/2003 | Terrell et al. |
| 2004/0024961 A1 | 2/2004 | Cochran et al. |
| 2004/0030857 A1 | 2/2004 | Krakirian et al. |
| 2004/0039939 A1 | 2/2004 | Cox et al. |
| 2004/0054776 A1 | 3/2004 | Klotz et al. |
| 2004/0057389 A1 | 3/2004 | Klotz et al. |
| 2004/0059807 A1 | 3/2004 | Klotz et al. |
| 2004/0088574 A1 | 5/2004 | Walter et al. |
| 2004/0117438 A1 | 6/2004 | Considine et al. |
| 2004/0123029 A1 | 6/2004 | Dalal et al. |
| 2004/0128470 A1 | 7/2004 | Hetzler et al. |
| 2004/0128540 A1 | 7/2004 | Roskind |
| 2004/0153863 A1 | 8/2004 | Klotz et al. |
| 2004/0190901 A1 | 9/2004 | Fang |
| 2004/0215749 A1 | 10/2004 | Tsao |
| 2004/0230848 A1 | 11/2004 | Mayo et al. |
| 2004/0250034 A1 | 12/2004 | Yagawa et al. |
| 2005/0033936 A1 | 2/2005 | Nakano et al. |
| 2005/0036499 A1 | 2/2005 | Dutt et al. |
| 2005/0050211 A1 | 3/2005 | Kaul et al. |
| 2005/0050270 A1 | 3/2005 | Horn et al. |
| 2005/0053073 A1 | 3/2005 | Kloth et al. |
| 2005/0055428 A1 | 3/2005 | Terai et al. |
| 2005/0060574 A1 | 3/2005 | Klotz et al. |
| 2005/0060598 A1 | 3/2005 | Klotz et al. |
| 2005/0071851 A1 | 3/2005 | Opheim |
| 2005/0076113 A1 | 4/2005 | Klotz et al. |
| 2005/0091426 A1 | 4/2005 | Horn et al. |
| 2005/0114611 A1 | 5/2005 | Durham et al. |
| 2005/0114615 A1 | 5/2005 | Ogasawara et al. |
| 2005/0117522 A1 | 6/2005 | Basavaiah et al. |

(56) References Cited

U.S. PATENT DOCUMENTS

| | | |
|---|---|---|
| 2005/0117562 A1 | 6/2005 | Wrenn |
| 2005/0138287 A1 | 6/2005 | Ogasawara et al. |
| 2005/0169188 A1 | 8/2005 | Cometto et al. |
| 2005/0185597 A1 | 8/2005 | Le et al. |
| 2005/0188170 A1 | 8/2005 | Yamamoto |
| 2005/0198523 A1 | 9/2005 | Shanbhag et al. |
| 2005/0235072 A1 | 10/2005 | Smith et al. |
| 2005/0283658 A1 | 12/2005 | Clark et al. |
| 2006/0015861 A1 | 1/2006 | Takata et al. |
| 2006/0015928 A1 | 1/2006 | Setty et al. |
| 2006/0034302 A1 | 2/2006 | Peterson |
| 2006/0045021 A1 | 3/2006 | Deragon et al. |
| 2006/0075191 A1 | 4/2006 | Lolayekar et al. |
| 2006/0098672 A1 | 5/2006 | Schzukin et al. |
| 2006/0117099 A1 | 6/2006 | Mogul |
| 2006/0136684 A1 | 6/2006 | Le et al. |
| 2006/0184287 A1 | 8/2006 | Belady et al. |
| 2006/0198319 A1 | 9/2006 | Schondelmayer et al. |
| 2006/0215297 A1 | 9/2006 | Kikuchi |
| 2006/0230227 A1 | 10/2006 | Ogasawara et al. |
| 2006/0242332 A1 | 10/2006 | Johnsen et al. |
| 2006/0251111 A1 | 11/2006 | Kloth et al. |
| 2007/0005297 A1 | 1/2007 | Beresniewicz et al. |
| 2007/0067593 A1 | 3/2007 | Satoyama et al. |
| 2007/0079068 A1 | 4/2007 | Draggon |
| 2007/0091903 A1 | 4/2007 | Atkinson |
| 2007/0094465 A1 | 4/2007 | Sharma et al. |
| 2007/0101202 A1 | 5/2007 | Garbow |
| 2007/0121519 A1 | 5/2007 | Cuni et al. |
| 2007/0136541 A1 | 6/2007 | Herz et al. |
| 2007/0162969 A1 | 7/2007 | Becker |
| 2007/0211640 A1 | 9/2007 | Palacharla et al. |
| 2007/0214316 A1 | 9/2007 | Kim |
| 2007/0250838 A1 | 10/2007 | Belady et al. |
| 2007/0258380 A1 | 11/2007 | Chamdani et al. |
| 2007/0263545 A1 | 11/2007 | Foster et al. |
| 2007/0276884 A1 | 11/2007 | Hara et al. |
| 2007/0283059 A1 | 12/2007 | Ho et al. |
| 2008/0016412 A1 | 1/2008 | White et al. |
| 2008/0034149 A1 | 2/2008 | Sheen |
| 2008/0052459 A1 | 2/2008 | Chang et al. |
| 2008/0059698 A1 | 3/2008 | Kabir et al. |
| 2008/0114933 A1 | 5/2008 | Ogasawara et al. |
| 2008/0126509 A1 | 5/2008 | Subrannanian et al. |
| 2008/0126734 A1 | 5/2008 | Murase |
| 2008/0168304 A1 | 7/2008 | Flynn et al. |
| 2008/0201616 A1 | 8/2008 | Ashmore |
| 2008/0244184 A1 | 10/2008 | Lewis et al. |
| 2008/0256082 A1 | 10/2008 | Davies et al. |
| 2008/0267217 A1 | 10/2008 | Colville et al. |
| 2008/0288661 A1 | 11/2008 | Galles |
| 2008/0294888 A1 | 11/2008 | Ando et al. |
| 2009/0006708 A1* | 1/2009 | Lim .................. G06F 13/4022 710/314 |
| 2009/0063766 A1 | 3/2009 | Matsumura et al. |
| 2009/0083484 A1 | 3/2009 | Basham et al. |
| 2009/0089567 A1 | 4/2009 | Boland, IV et al. |
| 2009/0094380 A1 | 4/2009 | Qiu et al. |
| 2009/0094664 A1 | 4/2009 | Butler et al. |
| 2009/0125694 A1 | 5/2009 | Innan et al. |
| 2009/0193223 A1 | 7/2009 | Saliba et al. |
| 2009/0201926 A1 | 8/2009 | Kagan et al. |
| 2009/0222733 A1 | 9/2009 | Basham et al. |
| 2009/0240873 A1 | 9/2009 | Yu et al. |
| 2009/0282471 A1 | 11/2009 | Green et al. |
| 2009/0323706 A1 | 12/2009 | Germain et al. |
| 2010/0011365 A1 | 1/2010 | Gerovac et al. |
| 2010/0030995 A1 | 2/2010 | Wang et al. |
| 2010/0046378 A1 | 2/2010 | Knapp et al. |
| 2010/0083055 A1 | 4/2010 | Ozonat |
| 2010/0174968 A1 | 7/2010 | Charles et al. |
| 2010/0318609 A1 | 12/2010 | Lahiri et al. |
| 2010/0318837 A1 | 12/2010 | Murphy et al. |
| 2011/0010394 A1 | 1/2011 | Carew et al. |
| 2011/0022691 A1 | 1/2011 | Banerjee et al. |
| 2011/0029824 A1 | 2/2011 | Schöler et al. |
| 2011/0035494 A1 | 2/2011 | Pandey et al. |
| 2011/0075667 A1 | 3/2011 | Li et al. |
| 2011/0087848 A1 | 4/2011 | Trent |
| 2011/0119556 A1 | 5/2011 | de Buen |
| 2011/0142053 A1 | 6/2011 | Van Der Merwe et al. |
| 2011/0161496 A1 | 6/2011 | Nicklin |
| 2011/0173303 A1 | 7/2011 | Rider |
| 2011/0228679 A1 | 9/2011 | Varma et al. |
| 2011/0231899 A1 | 9/2011 | Pulier et al. |
| 2011/0239039 A1 | 9/2011 | Dieffenbach et al. |
| 2011/0252274 A1 | 10/2011 | Kawaguchi et al. |
| 2011/0255540 A1 | 10/2011 | Mizrahi et al. |
| 2011/0276584 A1 | 11/2011 | Cotner et al. |
| 2011/0276675 A1 | 11/2011 | Singh et al. |
| 2011/0276951 A1 | 11/2011 | Jain |
| 2011/0299539 A1 | 12/2011 | Rajagopal et al. |
| 2011/0307450 A1 | 12/2011 | Hahn et al. |
| 2011/0313973 A1 | 12/2011 | Srivas et al. |
| 2012/0023319 A1 | 1/2012 | Chin et al. |
| 2012/0030401 A1 | 2/2012 | Cowan et al. |
| 2012/0054367 A1 | 3/2012 | Ramakrishnan et al. |
| 2012/0072578 A1 | 3/2012 | Alam |
| 2012/0072985 A1 | 3/2012 | Davne et al. |
| 2012/0075999 A1 | 3/2012 | Ko et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0130874 A1 | 5/2012 | Mane et al. |
| 2012/0131174 A1 | 5/2012 | Ferris et al. |
| 2012/0134672 A1 | 5/2012 | Banerjee |
| 2012/0144014 A1 | 6/2012 | Natham et al. |
| 2012/0159112 A1 | 6/2012 | Tokusho et al. |
| 2012/0167094 A1 | 6/2012 | Suit |
| 2012/0173581 A1 | 7/2012 | Hartig et al. |
| 2012/0173589 A1 | 7/2012 | Kwon et al. |
| 2012/0177039 A1 | 7/2012 | Berman |
| 2012/0177041 A1 | 7/2012 | Berman |
| 2012/0177042 A1 | 7/2012 | Berman |
| 2012/0177043 A1 | 7/2012 | Berman |
| 2012/0177044 A1 | 7/2012 | Berman |
| 2012/0177045 A1 | 7/2012 | Berman |
| 2012/0177370 A1 | 7/2012 | Berman |
| 2012/0179909 A1 | 7/2012 | Sagi et al. |
| 2012/0201138 A1 | 8/2012 | Yu et al. |
| 2012/0210041 A1 | 8/2012 | Flynn et al. |
| 2012/0254440 A1 | 10/2012 | Wang |
| 2012/0257501 A1 | 10/2012 | Kucharczyk |
| 2012/0265976 A1 | 10/2012 | Spiers et al. |
| 2012/0281706 A1 | 11/2012 | Agarwal et al. |
| 2012/0297088 A1 | 11/2012 | Wang et al. |
| 2012/0303618 A1 | 11/2012 | Dutta et al. |
| 2012/0311106 A1 | 12/2012 | Morgan |
| 2012/0311568 A1 | 12/2012 | Jansen |
| 2012/0320788 A1 | 12/2012 | Venkataramanan et al. |
| 2012/0324114 A1 | 12/2012 | Dutta et al. |
| 2012/0331171 A1 | 12/2012 | Bose et al. |
| 2013/0003737 A1 | 1/2013 | Sinicrope |
| 2013/0013664 A1 | 1/2013 | Baird et al. |
| 2013/0028135 A1 | 1/2013 | Berman |
| 2013/0036212 A1 | 2/2013 | Jibbe et al. |
| 2013/0036213 A1 | 2/2013 | Hasan et al. |
| 2013/0036449 A1 | 2/2013 | Mukkara et al. |
| 2013/0054888 A1 | 2/2013 | Bhat et al. |
| 2013/0061089 A1 | 3/2013 | Valiyaparambil et al. |
| 2013/0067162 A1 | 3/2013 | Jayaraman et al. |
| 2013/0080823 A1 | 3/2013 | Roth et al. |
| 2013/0080825 A1* | 3/2013 | Buckland ............ G06F 13/4022 714/4.5 |
| 2013/0086340 A1 | 4/2013 | Fleming et al. |
| 2013/0100858 A1 | 4/2013 | Kamath et al. |
| 2013/0111540 A1 | 5/2013 | Sabin |
| 2013/0138816 A1 | 5/2013 | Kuo et al. |
| 2013/0138836 A1 | 5/2013 | Cohen et al. |
| 2013/0139138 A1 | 5/2013 | Kakos |
| 2013/0144933 A1 | 6/2013 | Hinni et al. |
| 2013/0152076 A1 | 6/2013 | Patel |
| 2013/0152175 A1 | 6/2013 | Hromoko et al. |
| 2013/0163426 A1 | 6/2013 | Beliveau et al. |

(56) References Cited

U.S. PATENT DOCUMENTS

| | | |
|---|---|---|
| 2013/0163606 A1 | 6/2013 | Bagepalli et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198730 A1 | 8/2013 | Munireddy et al. |
| 2013/0208888 A1 | 8/2013 | Agrawal et al. |
| 2013/0212130 A1 | 8/2013 | Rahnama |
| 2013/0223236 A1 | 8/2013 | Dickey |
| 2013/0238641 A1 | 9/2013 | Mandelstein et al. |
| 2013/0266307 A1 | 10/2013 | Garg et al. |
| 2013/0268922 A1 | 10/2013 | Tiwari et al. |
| 2013/0275470 A1 | 10/2013 | Cao et al. |
| 2013/0297655 A1 | 11/2013 | Narasayya et al. |
| 2013/0297769 A1 | 11/2013 | Chang et al. |
| 2013/0318134 A1 | 11/2013 | Bolik et al. |
| 2013/0318288 A1 | 11/2013 | Khan et al. |
| 2014/0006708 A1 | 1/2014 | Huynh et al. |
| 2014/0016493 A1 | 1/2014 | Johnsson et al. |
| 2014/0019684 A1 | 1/2014 | Wei et al. |
| 2014/0025770 A1 | 1/2014 | Warfield et al. |
| 2014/0029441 A1 | 1/2014 | Nydell |
| 2014/0029442 A1 | 1/2014 | Wallman |
| 2014/0039683 A1 | 2/2014 | Zimmermann et al. |
| 2014/0040473 A1 | 2/2014 | Ho Rcky et al. |
| 2014/0040883 A1 | 2/2014 | Tompkins |
| 2014/0047201 A1 | 2/2014 | Mehta |
| 2014/0053264 A1 | 2/2014 | Dubrovsky et al. |
| 2014/0059187 A1 | 2/2014 | Rosset et al. |
| 2014/0059266 A1 | 2/2014 | Ben-Michael et al. |
| 2014/0086253 A1 | 3/2014 | Yong |
| 2014/0089273 A1 | 3/2014 | Borshack et al. |
| 2014/0095556 A1 | 4/2014 | Lee et al. |
| 2014/0096249 A1 | 4/2014 | Dupont et al. |
| 2014/0105009 A1 | 4/2014 | Vos et al. |
| 2014/0108474 A1 | 4/2014 | David et al. |
| 2014/0109071 A1 | 4/2014 | Ding et al. |
| 2014/0112122 A1 | 4/2014 | Kapadia et al. |
| 2014/0123207 A1 | 5/2014 | Agarwal et al. |
| 2014/0156557 A1 | 6/2014 | Zeng et al. |
| 2014/0164666 A1 | 6/2014 | Yand |
| 2014/0164866 A1 | 6/2014 | Bolotov et al. |
| 2014/0172371 A1 | 6/2014 | Zhu et al. |
| 2014/0173060 A1 | 6/2014 | Jubran et al. |
| 2014/0173195 A1 | 6/2014 | Rosset et al. |
| 2014/0173579 A1 | 6/2014 | McDonald et al. |
| 2014/0189278 A1 | 7/2014 | Peng |
| 2014/0198794 A1 | 7/2014 | Mehta et al. |
| 2014/0211661 A1 | 7/2014 | Gorkemli et al. |
| 2014/0215265 A1 | 7/2014 | Mohanta et al. |
| 2014/0215590 A1 | 7/2014 | Brand |
| 2014/0219086 A1 | 8/2014 | Cantu' et al. |
| 2014/0222953 A1 | 8/2014 | Karve et al. |
| 2014/0229790 A1 | 8/2014 | Goss et al. |
| 2014/0244585 A1 | 8/2014 | Sivasubramanian et al. |
| 2014/0244897 A1 | 8/2014 | Goss et al. |
| 2014/0245435 A1 | 8/2014 | Belenky |
| 2014/0269390 A1 | 9/2014 | Ciodaru et al. |
| 2014/0281700 A1 | 9/2014 | Nagesharao et al. |
| 2014/0297941 A1 | 10/2014 | Rajani et al. |
| 2014/0307578 A1 | 10/2014 | DeSanti |
| 2014/0317206 A1 | 10/2014 | Lomelino et al. |
| 2014/0324862 A1 | 10/2014 | Bingham et al. |
| 2014/0325208 A1 | 10/2014 | Resch et al. |
| 2014/0331276 A1 | 11/2014 | Frascadore et al. |
| 2014/0348166 A1 | 11/2014 | Yang et al. |
| 2014/0351654 A1* | 11/2014 | Zhang ............... G06F 11/2221 714/43 |
| 2014/0355450 A1 | 12/2014 | Bhikkaji et al. |
| 2014/0366155 A1 | 12/2014 | Chang et al. |
| 2014/0376550 A1 | 12/2014 | Khan et al. |
| 2015/0003450 A1 | 1/2015 | Salam et al. |
| 2015/0003458 A1 | 1/2015 | Li et al. |
| 2015/0003463 A1 | 1/2015 | Li et al. |
| 2015/0010001 A1 | 1/2015 | Duda et al. |
| 2015/0016461 A1 | 1/2015 | Qiang |
| 2015/0030024 A1 | 1/2015 | Venkataswami et al. |
| 2015/0046123 A1 | 2/2015 | Kato |
| 2015/0063353 A1 | 3/2015 | Kapadia et al. |
| 2015/0067001 A1 | 3/2015 | Koltsidas |
| 2015/0067226 A1 | 3/2015 | Iskandar et al. |
| 2015/0082432 A1 | 3/2015 | Eaton et al. |
| 2015/0092824 A1 | 4/2015 | Wicker, Jr. et al. |
| 2015/0120907 A1 | 4/2015 | Niestemski et al. |
| 2015/0121131 A1 | 4/2015 | Kiselev et al. |
| 2015/0127979 A1 | 5/2015 | Doppalapudi |
| 2015/0142840 A1 | 5/2015 | Baldwin et al. |
| 2015/0169313 A1 | 6/2015 | Katsura |
| 2015/0180672 A1 | 6/2015 | Kuwata |
| 2015/0207763 A1 | 6/2015 | Bertran Ortiz et al. |
| 2015/0205974 A1 | 7/2015 | Talley et al. |
| 2015/0212755 A1* | 7/2015 | Asnaashari .......... G06F 3/0629 711/103 |
| 2015/0222444 A1 | 8/2015 | Sarkar |
| 2015/0229546 A1 | 8/2015 | Somaiya et al. |
| 2015/0248366 A1 | 9/2015 | Bergsten et al. |
| 2015/0248418 A1 | 9/2015 | Bhardwaj et al. |
| 2015/0254003 A1 | 9/2015 | Lee et al. |
| 2015/0254088 A1 | 9/2015 | Chou et al. |
| 2015/0261446 A1 | 9/2015 | Lee |
| 2015/0263993 A1 | 9/2015 | Kuch et al. |
| 2015/0269048 A1 | 9/2015 | Marr et al. |
| 2015/0277804 A1 | 10/2015 | Arnold et al. |
| 2015/0278040 A1* | 10/2015 | Sikkink .............. G06F 13/4022 714/5.1 |
| 2015/0281067 A1 | 10/2015 | Wu |
| 2015/0303949 A1 | 10/2015 | Jafarkhani et al. |
| 2015/0339246 A1* | 11/2015 | Sakurai ................. G06F 13/28 710/308 |
| 2015/0341237 A1 | 11/2015 | Cuni et al. |
| 2015/0341239 A1 | 11/2015 | Bertran Ortiz et al. |
| 2015/0358136 A1 | 12/2015 | Medard |
| 2015/0379150 A1 | 12/2015 | Duda |
| 2016/0004611 A1 | 1/2016 | Lakshman et al. |
| 2016/0011936 A1 | 1/2016 | Luby |
| 2016/0011942 A1 | 1/2016 | Golbourn et al. |
| 2016/0054922 A1 | 2/2016 | Awasthi et al. |
| 2016/0062820 A1 | 3/2016 | Jones et al. |
| 2016/0070652 A1 | 3/2016 | Sundararaman et al. |
| 2016/0087885 A1 | 3/2016 | Tripathi et al. |
| 2016/0088083 A1 | 3/2016 | Bharadwaj et al. |
| 2016/0119159 A1 | 4/2016 | Zhao et al. |
| 2016/0119421 A1 | 4/2016 | Semke et al. |
| 2016/0139820 A1 | 5/2016 | Fluman et al. |
| 2016/0149639 A1 | 5/2016 | Pham et al. |
| 2016/0205189 A1 | 7/2016 | Mopur et al. |
| 2016/0210161 A1 | 7/2016 | Rosset et al. |
| 2016/0231928 A1 | 8/2016 | Lewis et al. |
| 2016/0274926 A1 | 9/2016 | Narasimhamurthy et al. |
| 2016/0285760 A1 | 9/2016 | Dong |
| 2016/0292359 A1 | 10/2016 | Tellis et al. |
| 2016/0294983 A1 | 10/2016 | Kliteynik et al. |
| 2016/0306768 A1* | 10/2016 | Mataya ............... G06F 13/4068 |
| 2016/0334998 A1 | 11/2016 | George et al. |
| 2016/0366094 A1 | 12/2016 | Mason et al. |
| 2016/0378624 A1 | 12/2016 | Jenkins, Jr. et al. |
| 2016/0380694 A1 | 12/2016 | Guduru |
| 2017/0010874 A1 | 1/2017 | Rosset |
| 2017/0010930 A1 | 1/2017 | Dutta et al. |
| 2017/0019475 A1 | 1/2017 | Metz et al. |
| 2017/0068630 A1 | 3/2017 | Iskandar et al. |
| 2017/0168970 A1 | 6/2017 | Sajeepa et al. |
| 2017/0177860 A1 | 6/2017 | Suarez et al. |
| 2017/0212858 A1 | 7/2017 | Chu et al. |
| 2017/0273019 A1 | 9/2017 | Park et al. |
| 2017/0277655 A1 | 9/2017 | Das et al. |
| 2017/0337097 A1 | 11/2017 | Sipos et al. |
| 2017/0340113 A1 | 11/2017 | Charest et al. |
| 2017/0371558 A1 | 12/2017 | George et al. |

(56) References Cited

U.S. PATENT DOCUMENTS

2018/0032462 A1\* 2/2018 Olarig ............ G06F 13/4022
2018/0097707 A1 4/2018 Wright et al.

OTHER PUBLICATIONS

Peterson, C., "Introducing Lighting: A flexible NVMe JBOF," Open Compute, Mar. 9, 2016, 6 pages.
Stamey, John, et al., "Client-Side Dynamic Metadata in Web 2.0," SIGDOC '07, Oct. 22-24, 2007, pp. 155-161.

\* cited by examiner

DYNAMIC PARTITION OF PCIE DISK ARRAYS BASED ON SOFTWARE CONFIGURATION / POLICY DISTRIBUTION

TECHNICAL FIELD

This disclosure relates in general to the field of communications and, more particularly, to methods and systems for dynamically partitioning of Peripheral Component Interconnect Express (PCIe) disk arrays based on software configuration/policy distribution.

BACKGROUND

Increased use of Solid-State-Drives (SSD) in PCIe disk arrays in data center storage solutions has not only significantly reduced input/output (I/O) latency, but has also been able to alleviate I/O bottlenecks by providing a much higher I/O performance without the need for a large number of disk enclosures. However, given the extreme advances in performance, the performance of network controllers and other network devices has thus far lagged behind in handling the vastly increased I/O traffic.

To handle the controller bottleneck, an NVMe (Non-Volatile Memory Express) interface has been developed, which gains great advantages over the traditional SAS)/SATA interface (SAS=Serial Attached SCSI; SATA=Serial Advanced Technology Attachment) due to the direct PCIe connection between central processing unit CPU and the SSD, which leads to linearly scalable bandwidth and considerable reduction in latency. However, on the other hand, current NVMe implementations are too tightly coupled to CPUs such that failover of SSDs may cause problems. To loosen the prior art tight coupling between CPU and SSD, PCIe switches have been involved in the storage solution, which, not only natively extend the limited CPU PCIe bandwidth, but also isolate the SSD failure issue, at the cost of increased CPU to SSD latency.

To handle the network bottleneck for I/O performance, hyper convergence has become the new trend for data center infrastructure. Comparing to the traditional centralized storage, such as SAN (Storage Area Network), where the storage pool as a whole is accessed by hosts via a network, hyper convergence is basically a distributed storage platform, implemented by natively integrating the compute and storage components together as a node, and aggregating nodes into cluster. Hyper convergence fully utilizes the localized I/O operation within a node, which significantly offloads the network traffic. However, there remains heavy traffic on the node-to-node network due to the distributed storage requirement, such as data replica and synchronization.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Figure 1A:
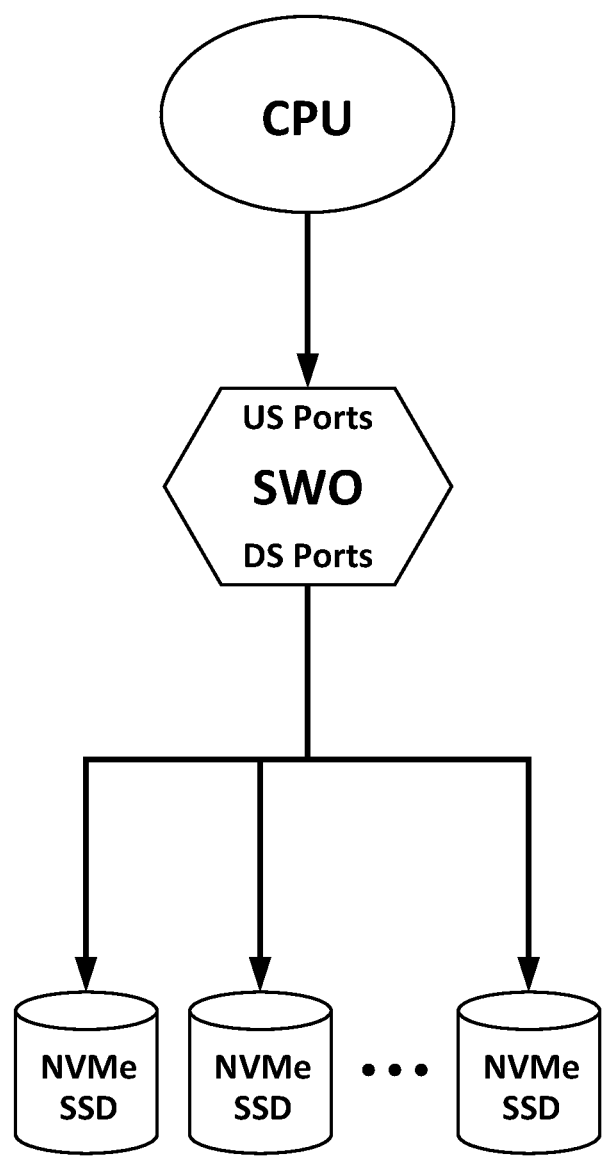
FIGS. 1(*a*) through 1(*e*) show simplified schematic diagrams illustrating basic topologies for connecting CPU and NVMe SSDs by way of PCIe switches, according to some embodiments of the present disclosure.
Figure 1B:
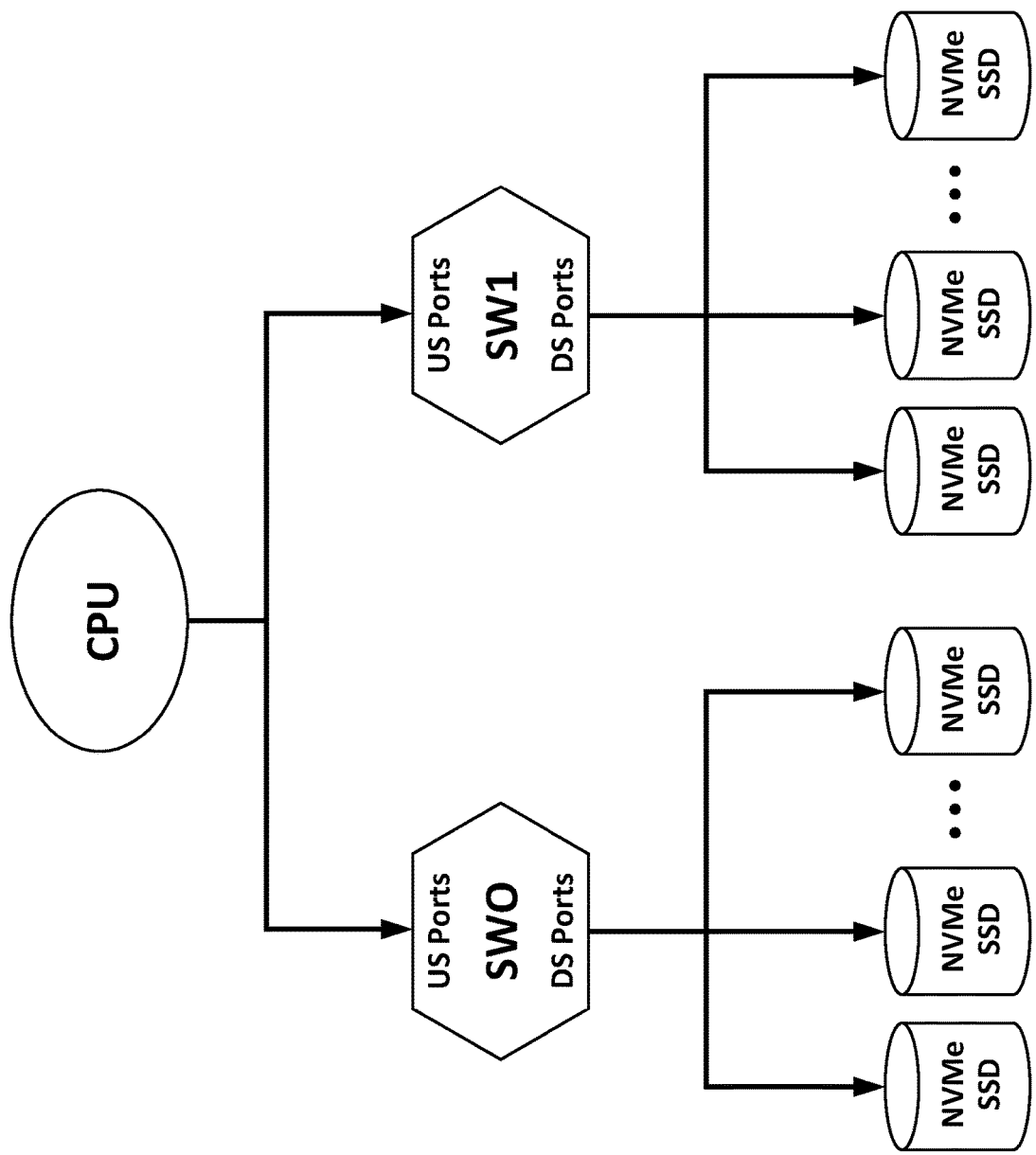
Figure 1C:
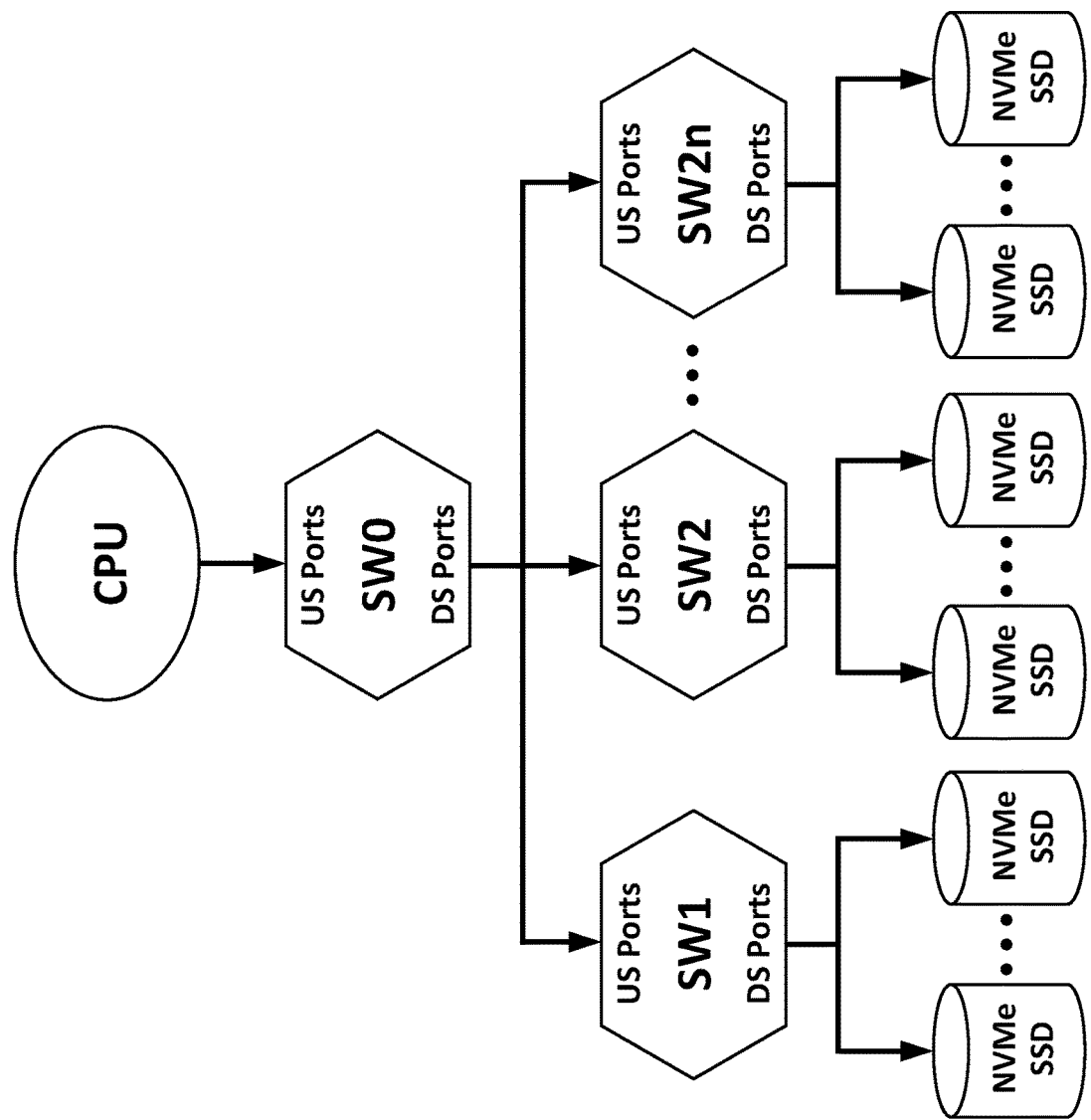

Various embodiments of the present disclosure relate to dynamically partitioning of PCIe disk arrays based on software configuration/policy distribution. The basic idea is to provide redundant PCIe links in the form of multiplexers connected between the downstream ports of switches SW0, SW1 and the Non-Volatile Memory Express (NVMe) Solid-State Drives (SSD), which can be switched dynamically according to a detected switch or SSD failure status and/or application policy/requirement. As used herein, the term "on the fly" and "dynamically" in the context of this disclosure describes activities or events that develop or occur, for example, while the process that the switch-over affects is ongoing, rather than as the result of something that is statically predefined. More particularly, the terms "hot swapping", "hot-add" and "hot-remove" refer to "on-the-fly" replacement of computer hardware, such as the described NVMe SSDs.

In one aspect of the present disclosure, an apparatus is proposed with at least one PCIe switch having an input port operatively connected to a respective CPU and at least one output port; and at least one multiplexer connected between the output port of the at least one PCIe switch and a PCIe disk array and configured connect the PCIe disk array in a first configuration to a single PCIe switch in either one-x4 port or two x2 port mode, or in a second configuration to two PCIe switches in x2 port mode, and to dynamically switch over between the first configuration and the second configuration on the fly. The designation "x2" indicates a 2-lane configuration (2 physical ports-x2 port mode), wherein "x4" indicates a 4-lane configuration (4 physical ports=x4 port mode). The ports may be implemented with optical fibers.

In an embodiment, the switch-over between the first configuration and the second configuration may take place responsive to a change in a configuration policy of the PCIe disk array.

In another embodiment, the switch-over between the first configuration and the second configuration may take place responsive to a surprise addition of a PCIe disk array (hot-add).

In yet another embodiment, the switch-over between the first configuration and the second configuration may take place responsive to a surprise remove of an NVMe SSD (hot-remove).

In another embodiment, the switch-over between the first configuration and the second configuration may take place sequentially based on predetermined timing requirements.

In yet another embodiment, when data traffic congestion is detected at a first PCIe switch, the at least one multiplexer is configured to redirect a portion of the data traffic from the first PCIe switch to a second PCIe switch for transmission to the PCIe disk array.

In yet another embodiment, when operating in x4 port mode, the at least one multiplexer is configured to migrate all data traffic from the first PCIe switch to a second PCIe switch upon detection of a failure of a first PCIe switch for transmission to the PCIe disk array.

In yet another embodiment, the PCIe disk array may be an NVMe SSD.

In yet another embodiment, the apparatus may include a control logic device operatively connected to at least one PCIe switch and the at least one multiplexer and configured to monitor PCIe disk array information and PCIe disk configuration policy execution.

In yet another embodiment, the control logic device may be connected for communication to a management platform, with the management platform managing policy for the control logic device.

In another aspect of the present disclosure, a method is proposed for dynamically switching over between configurations that connect a CPU to an NVMe SSD. The method includes connecting the PCIe disk array in a first configuration to an output port of a single PCIe switch in either one-x4 port or two x2 port mode, or in a second configuration to output ports of two PCIe switches in x2 port mode, and dynamically switching over between the first configuration and the second configuration on the fly.

In one embodiment, the PCIe disk array may be dynamically switched over by way of at least one multiplexer interposed between the PCIe disk array and the PCIe disk array.

In another embodiment, the PCIe disk array may be dynamically switched over responsive to a change in a configuration policy of the PCIe disk array, a surprise addition of a PCIe disk array (hot-add), a surprise remove of an NVMe SSD (hot-remove), or a combination thereof.

In yet another embodiment, when data traffic congestion is detected at a first PCIe switch, a portion of the data traffic may be redirected from the first PCIe switch to a second PCIe switch for transmission to the PCIe disk array In yet another embodiment, when operating in x4 port mode, all data traffic may be migrated to a second PCIe switch upon detection of a failure of a first PCIe switch for transmission to the PCIe disk array.

In yet another embodiment, dynamically switching over may include managing, with a control logic device operatively connected to at least one PCIe switch and the at least one multiplexer configuration, information of the PCIe disk array and status information of the at least one multiplexer.

As will be appreciated by one skilled in the art, aspects of the present disclosure, in particular the functionality related to various aspects of dynamic partitioning of PCIe disk arrays, may be controlled by computer programs. Accordingly, other aspects of the present disclosure relate to systems, computer programs, mechanisms, and means for carrying out the methods according to various embodiments described herein. Such systems, computer programs, mechanisms, and means could be included within various network devices, such as e.g. the management platform and the hypervisor. A computer program may, for example, be downloaded (updated) to the existing network devices and systems (e.g. to the existing routers, switches, various control nodes, etc.) or be stored upon manufacturing of these devices and systems.

In yet another aspect, the present application relates to one or more non-transitory computer readable storage media encoded with software comprising computer executable instructions and, when executed by a processor of a computer, operable to carry out the method according to various embodiments described herein.

In yet another aspect, the present application relates to a system comprising a plurality of computers, each computer connected to a first switching means in one-to-one correspondence, second switching means having each inputs connected to outputs of each of the first switching means and outputs connected to storage means, wherein the second switching means are configured to dynamically connect the storage means to the outputs of the first switching means on the fly.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be easily learned by the practice of the principles set forth herein.

Overview of the Peripheral Component Interconnect Express (PCIe) Architecture

One interconnect fabric architecture includes the Peripheral Component Interconnect Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCIe is a high performance, general purpose I/O interconnects defined for a wide variety of future computing and communication platforms. Some PCIe attributes, such as its usage model, load-store architecture, and software interfaces, have been maintained through its revisions, whereas previous parallel bus implementations have been replaced by a highly scalable, fully serial interface. The more recent versions of PCIe take advantage of advances in point-to-point interconnects, Switch-based technology, and packetized protocol to deliver new levels of performance and features. Power Management, Quality of Service (QoS), Hot-Plug/Hot-Swap support, Data Integrity, and Error Handling are among some of the advanced features supported by PCI Express.

Disadvantageously, however, much of the conventional switch-based technology with single x4 NMVe SSD does not have switch level redundancy that is required in high reliable storage products. To overcome this, the dual x2 port NVMe SSDs are designed which could be connected to 2 switches to gain redundancy. The connections between switch and SSDs are fixed in all the conventional methodology, and do not allow switch-over between dual-port mode and single-port mode on-the fly based on policy. The design proposed and illustrated in various embodiments of the present disclosure attempts to alleviate these shortcomings.

FIGS. 1 (a) through 1(c) illustrate basic topologies for connecting a CPU and NVMe SSDs via interposed PCIe switches. FIG. 1(a) shows a topology with only a single CPU and a single switch SW0. For a larger number of SSDs, the topologies may be extended in either a parallel arrangement, as illustrated in FIG. 1(b), with two switches SW0, SW1 having their respective input connected to a single CPU, or in a cascaded arrangement with two levels of switches, wherein switch SW0 in an upper level has an input connected to a single CPU and lower level switches SW1, SW2, . . . SWn connected between switch SW0 and the NVMe SSDs, as illustrated in FIG. 1(c). In all these three topologies of FIGS. 1(a) through (c), the SSDs operate in x4 PCIe mode and the connections between the CPU and the SSDs are fixed or hard-wired, which deprives these topologies of flexibility and reduces the reliability of this type of storage solution.

Figure 1D:
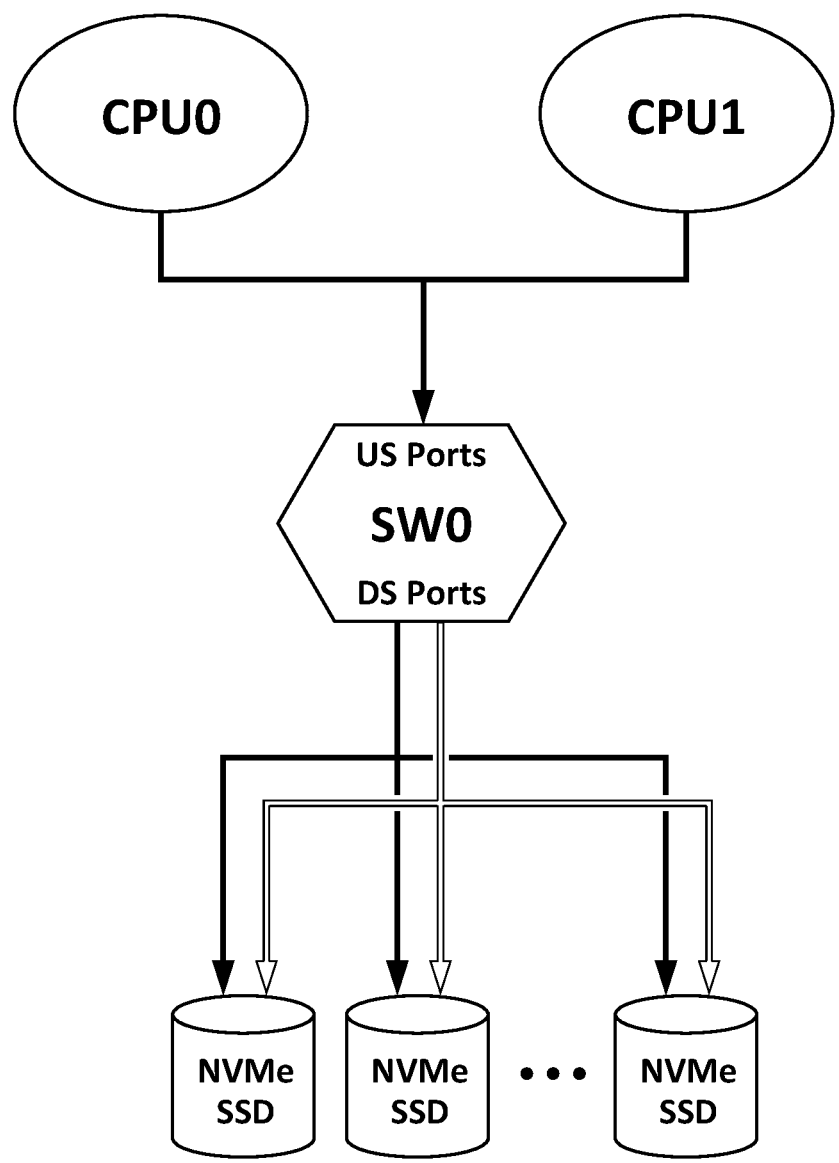
Figure 1E:
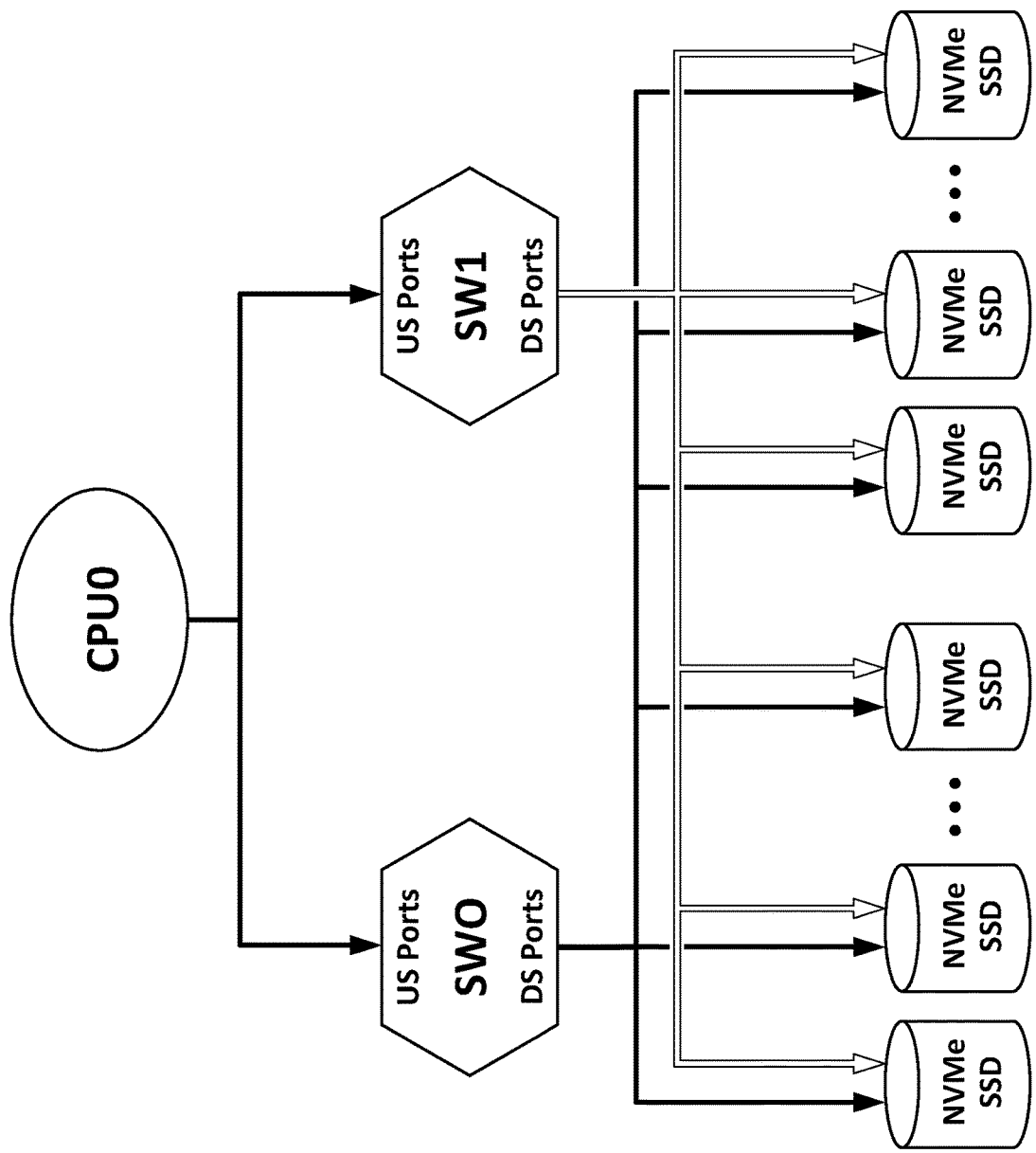

Redundancy at the CPU level (CPU redundancy) could be achieved by combining MR-IOV (Multiple Root I/O Virtualization) feature of the exemplary switches SW0 and SW1 and the NVMe SSD's dual-port feature, wherein two CPUs would be connected to the upstream (US) ports of switch SW0 of the topology in FIG. 1(a), allowing each CPU to be switched to any of the NVMe SSDs. This topology is illustrated in FIG. 1(d). Meanwhile, switch level redundancy could be implemented as shown in FIG. 1(e), wherein the downstream (DS) ports of each switch SW0 and SW1 could be connected to any of the NVMe SSDs. This will be referred to as switch redundancy. The two switches SW0 and SW1 could work in either active/active or active/passive mode, depending on application and CPU's I/O bandwidth requirement. CPU redundancy and switch redundancy may advantageously be combined to provide double-redundancy, both at the CPU level and at the switch level, which is illustrated with CPU0 and CPU1, and switches SW0 and SW1 in FIG. 2.

As mentioned above, the aforementioned topologies having either CPU redundancy or switch redundancy, or both, without forcing NMVe SSDs to work in dual 2x port mode to facilitate the redundant connection. There are also circumstances where flexibility is required to swap NVMe SSDs between dual-port and single-port mode on-the fly. The proposed design attempts to achieve providing redundancy without limiting the SSDs type that could be used in the storage system.

Example Embodiments of a Switchable NVMe SSD Interface Architecture

Figure 3:
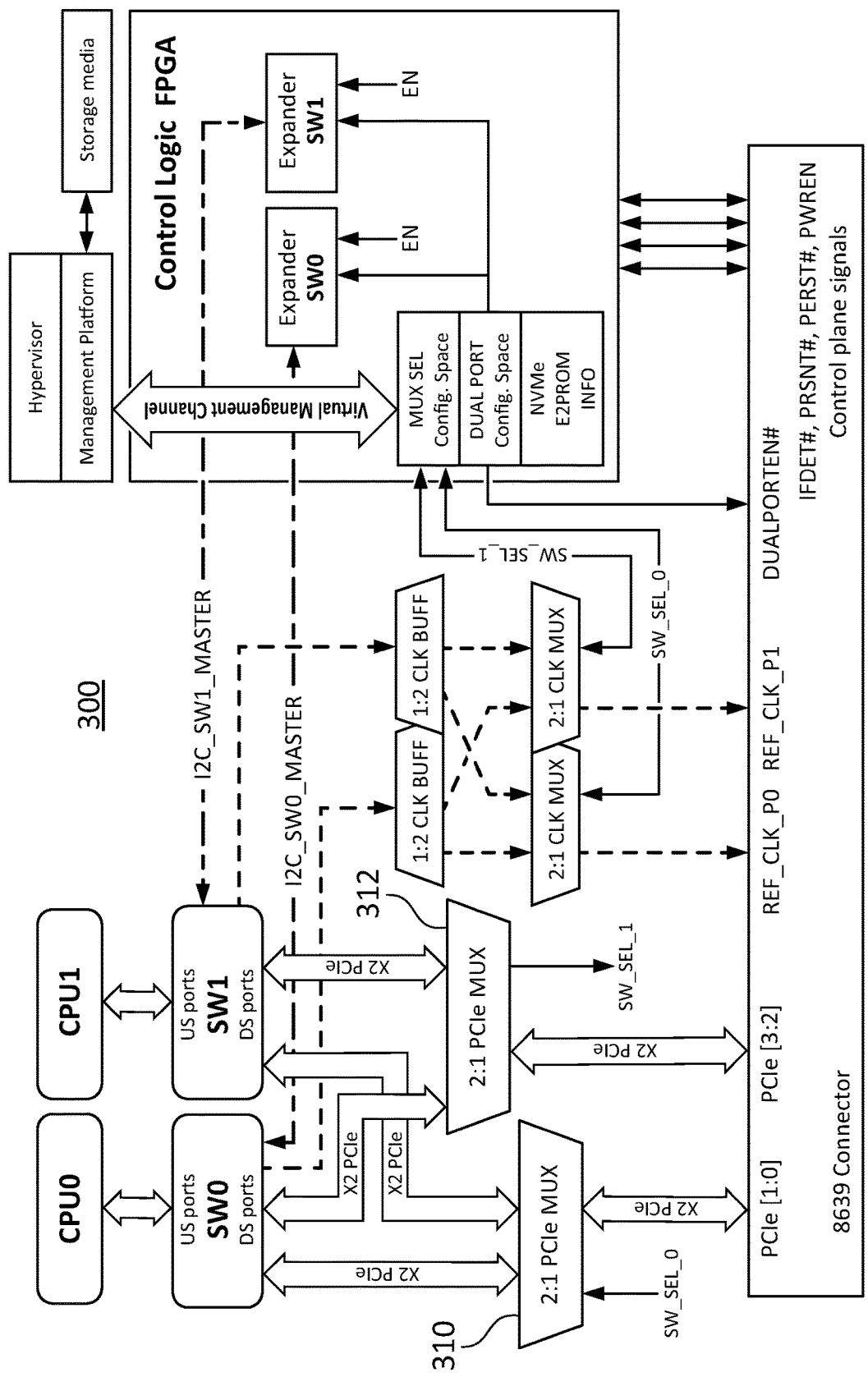
FIG. 3 illustrates a dynamically configurable NVMe SSD interface architecture according to some embodiments of the present disclosure.

The top level design of a proposed NVMe SSD interface architecture 300 is illustrated in FIG. 3. Considering the tradeoff between redundancy and switch port resources, a two-switch design may be an optimal choice. The basic idea is to provide redundant PCIe links between switches SW0, SW1 and the NVMe SSDs, which could be switched according to a detected switch or SSD failure status and/or application policy/requirement. The design has a total of four distinct components, namely switches; a hardware control logic device shown here exemplary as a FPGA (field-programmable gate array); NVMe SSDs connected at an 8639 drive backplane connector; and the upper level management platform, such as the Cisco UCSM (Unified Computing System Manager) in the present example.

The 8639 drive backplane connector is a 68-pin connector and designed to support PCI Express as well as hot-plug and hot-remove, both with and without prior system notification (surprise hot-remove).

The PCIe signal in the data plane (double arrows) and its reference clock in the clock plane (dashed lines), side band signals (includes Dual-Port Enable DUALPORTEN #/Interface Detect IFDET #/Hot-Plug Detect PRSNT #/PCIe device reset PERST #/Power Enable PWREN) in the control plane are necessary to facilitate all the SSD operation timing control and are assigned to specific pins on the 8639 connector. The control plane signals are connected, either directly or indirectly on the FPGA to the Expander_SW1 and Expander_SW2. The signal EN is an enable signal.

The present disclosure addresses only the traffic in the data plane between the downstream ports of switches SW0, SW1 and the NVMe SSDs. For the connection between the upstream ports of the switches SW0, SW1 and one or more CPUs, any of the topologies illustrated in FIG. 1 and the redundant topology illustrated in FIG. 2 could be used. In other words, the connectivity of the downstream ports to the NVMe SSDs is not affected by the topology of the upstream ports. It will be understood that the number of illustrated CPUs, switches and NVMe SSDs are merely examples and any number of such devices can be used that can be interconnected and addressed in the manner described.

The hardware control logic device, herein also referred to simply as FPGA, deals with all the control logic such as SSD information collection and reporting, policy execution and optional indicator light (LED) management. The management platform interfaces between hypervisor and FPGA and collects SSD information and delivers an application requirement in the form of policy.

The virtual channel connecting the FPGA to the management platform could be implemented via multiple ways, for example Ethernet. To support both single port and dual port mode for the NVMe, the system must be able to modify the bifurcation of the downstream ports of the switches SW0, SW1 on the fly. The term "on the fly" in the context of this disclosure describes activities or events that develop or occur dynamically, i.e. while the process that the switchover affects is ongoing, rather than as the result of something that is statically predefined. More particularly, the term "hot swapping" refers to "on-the-fly" replacement of computer hardware, such as the described NVMe SSDs. This is accomplished by sending a reconfiguration command to switch the ASIC (application-specific integrated circuit) itself (MRPC=multicast remote procedure call command in PMC PCIe switch). The connection of the switches SW0, SW1 to a 2:1 PCIe multiplexer (PCIe MUX) is implemented downstream of PCIe port switching to gain redundancy regardless of whether single x4 SSD or dual x2 SSD are attached. This on the fly switching is based on policy or software configuration.

All valid SSD configurations for a two-switch redundant situation are summarized in Table 1.

TABLE 1

| Work State | Dual_Porten_N | SW_SEL_0 | SW_SEL_1 | PE3 | Ref_CLK_P0 | Ref_CLK_P1 | IO Exp. SW0 EN | IO Exp. SW1 EN | PE_RST_P0 | PE_RST_P1 |
|---|---|---|---|---|---|---|---|---|---|---|
| W1 | 0 | 0 | 0 | Two x2 ports both from SW0 | SW0 | SW0 | 1 | 0 | SW0 | SW0, not used |
| W2 | 0 | 1 | 1 | Two x2 ports both from SW1 | SW1 | SW1 | 0 | 1 | SW1 | SW1, not used |

TABLE 1-continued

| Work State | Dual_Porten_N | SW_SEL_0 | SW_SEL_1 | PE3 | Ref_CLK_P0 | Ref_CLK_P1 | IO Exp. SW0 EN | IO Exp. SW1 EN | PE_RST_P0 | PE_RST_P1 |
|---|---|---|---|---|---|---|---|---|---|---|
| W3 | 0 | 0 | 1 | Port 1 from SW0, port 2 from SW1 | SW0 | SW1 | 1 | 1 | SW0 | SW1 |
| W4 | 0 | 1 | 0 | Port 1 from SW1, port 2 from SW0 | SW1 | SW0 | 1 | 1 | SW1 | SW0 |
| W5 | 1 | 0 | 0 | X4 from SW0 | SW0 | SW0, not used | 1 | 0 | SW0 | SW0, not used |
| W6 | 1 | 1 | 1 | X4 from SW1 | SW1 | SW1, not used | 0 | 1 | SW1 | SW1, not used |
|  | 1 | 0 | 1 | Forbidden | X | X | X | X | X | X |
|  | 1 | 1 | 0 | Forbidden | X | X | X | X | X | X |

In top design diagram of the NVMe SSD interface architecture 300 shown in FIG. 3, two CPUs CPU0 and CPU1 are each connected to respective upstream (US) ports of switches SW0, SW1. Note that there is no connection between CPU0 and SW1 and between CPU1 and SW0. Downstream (DS) ports of each switch are connected for data transfer to respective input ports of each of two 2:1 PCIe multiplexers (MUX) 310, 312, i.e. each CPU can transfer data to and receive data from each of the MUXs 310, 312. DUALPORTEN # is disabled (low=0) so that the NVMe SSD operates in x2 mode. In FIG. 3, the input ports of each of the MUXs 310, 312 are connected in x2 mode to a respective PCIe terminal, namely PCIe [1:0] and PCIe [3:2], on the 8639 connector and from there to unillustrated NVMe SSDs. The possible data links depend on the switch selections and the corresponding work states in x2 mode are listed in Table 1 as W1-W4.

Figure 4:
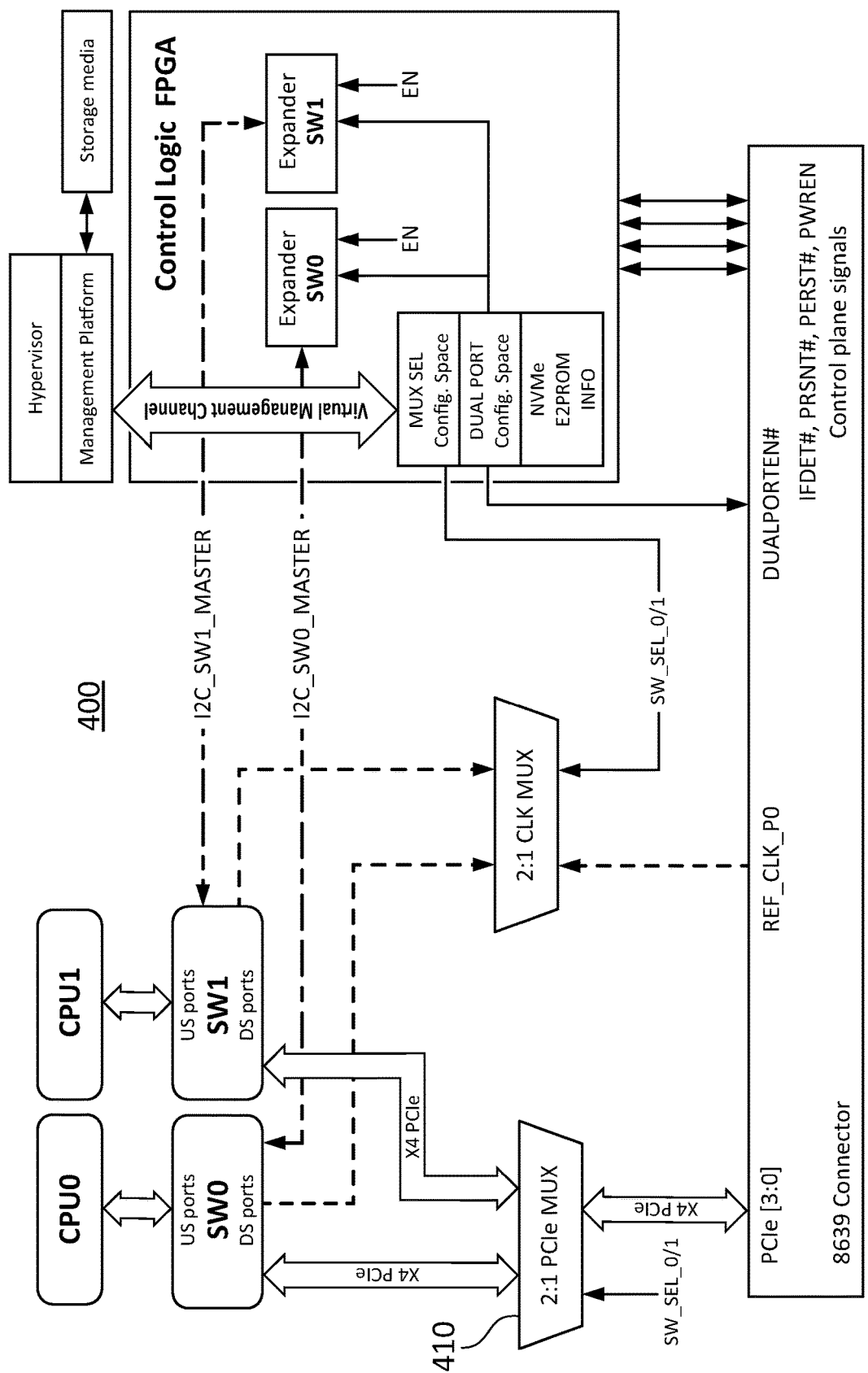
FIG. 4 shows a simplified structure of the dynamically configurable NVMe SSD interface architecture of FIG. 3.

Note that not all components of the FPGA are shown in FIG. 3, and reference is made to FIG. 4 for any component not shown in FIG. 3

For an easier understanding of the top design diagram of the NVMe SSD interface architecture 300 in FIG. 3, reference is now made to the exemplary system 400 illustrated in FIG. 4 which uses only a single multiplexer 410. It will be assumed that DUALPORTEN # is enabled (high=1) so that the unillustrated NVMe SSD connected to terminals PCIe [3:0] on the 8639 connector operates in x4 mode (x4 PCIe). The traffic in the data plane could then only be swapped between Work State W5 and Work State W6 in Table 1. Only one MUX 410 is used in this example. Both switch select signals SW_SEL_0 and SW_SEL_1 are selectively applied to MUX 410. The two LEDs (red LED; blue LED) shown in FIG. 4 are status indicators and have no bearing on the operation of the system 400.

The I²C GPIO Expanders shown in FIG. 4 are general-purpose input/output (GPIO) expanders that can be used via the I²C interface (I²C=Inter-Integrated Circuit) and allow more than one device to connect to a single port on a computer.

In a first Work State W5, the REF_CLK_P0 is enabled (=1) at the pinout of the 8639 connector, whereas the REF_CLK_P1 is disabled (not used). The I2C GPIO Expander SW0 on the FPGA is high=1, whereas the I2C GPIO Expander SW1 on the FPGA is low=0. With both the SW_SEL_0 and the SW_SEL_1 low (=0) in Work State W5, the 4-port (x4) PCIe [3:0] on the 8639 connector is connected to the NVMe SSD by way of switch SW0. PE_RST_P0 is signaling SW0, whereas PE_RST_P1 is not connected in FIG. 4 because the second 2:1 RST MUX is not used in this configuration. Likewise, the second 2:1 PCIe MUX 312 and the second 2:1 CLK MUX of FIG. 3 are also not used in FIG. 4 since SW1 is not addressed in Work State W5. The aforedescribed situation for the x4 Work State W5 is substantially equivalent to the Work State W1, where SW_SEL_0=SW_SEL_1=0 and DUALPORTEN # is disabled.

In a second Work State W6, the REF_CLK_P0 is enabled at the pinout of the 8639 connector, whereas the REF_CLK_P1 is disabled (not used). The I2C GPIO Expander SW0 on the FPGA is high=1, whereas the I2C GPIO Expander SW1 on the FPGA is low=0. With both the SW_SEL_0 and the SW_SEL_1 high (=1) in Work State W6, the 4-port (x4) PCIe [3:0] on the 8639 connector is connected to the NVMe SSD by way of switch SW1. PE_RST_P0 is signaling SW1, whereas PE_RST_P1 is not connected in FIG. 4 because as above, the second 2:1 RST Mux is not used in this configuration. Likewise, the second 2:1 PCIe Mux and the second 2:1 CLK Mux of FIG. 3 are also not used in FIG. 4 since SW0 is not addressed in Work State W6. The aforedescribed situation for the x4 Work State W5 is substantially equivalent to the Work State W1, where SW_SEL_0=SW_SEL_1=0 and DUALPORTEN # is disabled. To summarize, the x4 PCIe bus from SW0 and the x4 PCIe bus from SW1 are selectively, but never simultaneously, connected via the 2:1 PCI2 Mux to the x4 PCIe bus terminating at the connector 8639 at the PCIe[3:0] pin, and ultimately connected to a NVMe SSD (not shown).

As mentioned above with reference to FIG. 3, the other four valid Work States W1-W4 all employ two x2 ports instead of a single x4 port. The Work States W1 and W2 have been discussed above due to their similarity with the Work States W5 and W6. For the Work States W3 and W4, both Ref_CLK_P0 and Ref_CLK_P1 are high and either SW_SEL_0 or SW_SEL_1 is high, while the other is low. This selects port 1 from SW0 and port 2 from SW1 for Work State W5 and port 2 from SW0 and port 1 from SW1 for Work State W5. Switching between these Work States W1-W6 is schematically depicted in FIG. 5.

Exemplary Work State transitions

Figure 5:
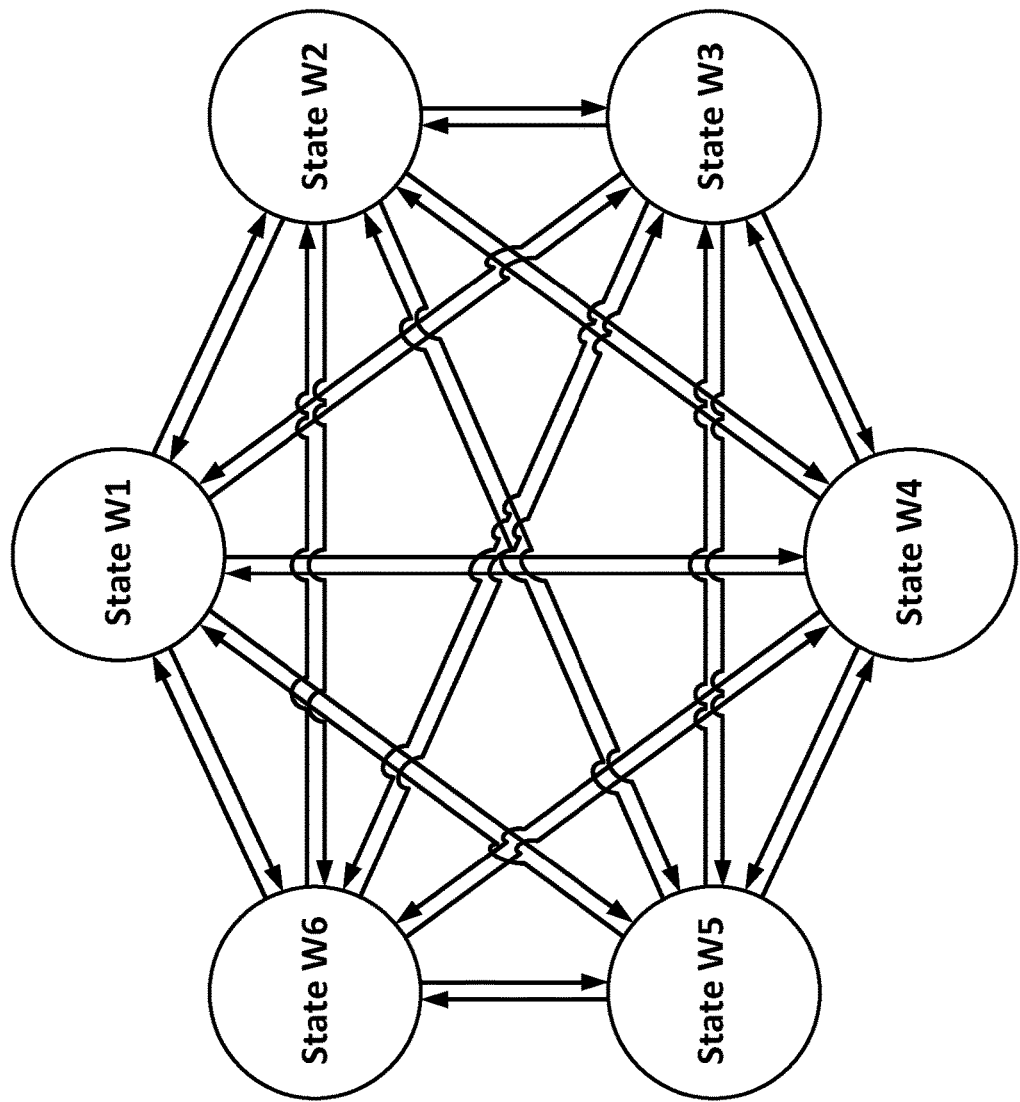
FIG. 5 illustrates schematically possible work state transitions for a NVMe SSD listed in Table 1.

Among all the possible work state transitions illustrated in FIG. 5, the following three examples are intended to demonstrate some of the benefits of this design.

Example 1: Transition from Work State W5 to Work State W1

Take into consideration the variant application I/O operation styles from high-bandwidth single-stream to lower bandwidth multiple-stream, storage virtualization platform needs to provide the flexibility to swap between them, and the transition from Work State_W5 to Work State_W1 facilitates the virtualization stack to make the best use of SSD's high capability for parallel I/O operation.

Example 2: Transition from Work State W5 to Work State W3

This transition could be utilized to implement switch level traffic offload. In one scenario where the upstream port of SW0 is suffering a traffic jam, half of its downstream SSDs could then be re-directed to SW1 to thus significantly improve the overall I/O data flow speed. This transition provides the possibility for a balanced storage load.

Example 3: Transition from Work State W5 to Work State W6

The most common application scenario for this transition is a switch failover. Assume, for example, that SW0 has failed. Data loss could then be avoided by migrating all traffic to and from the downstream port of SW0 to SW1. Since this redundancy is implemented in x4 single-port mode, no I/O performance loss occurs due to dual-port operation.

Figure 2:
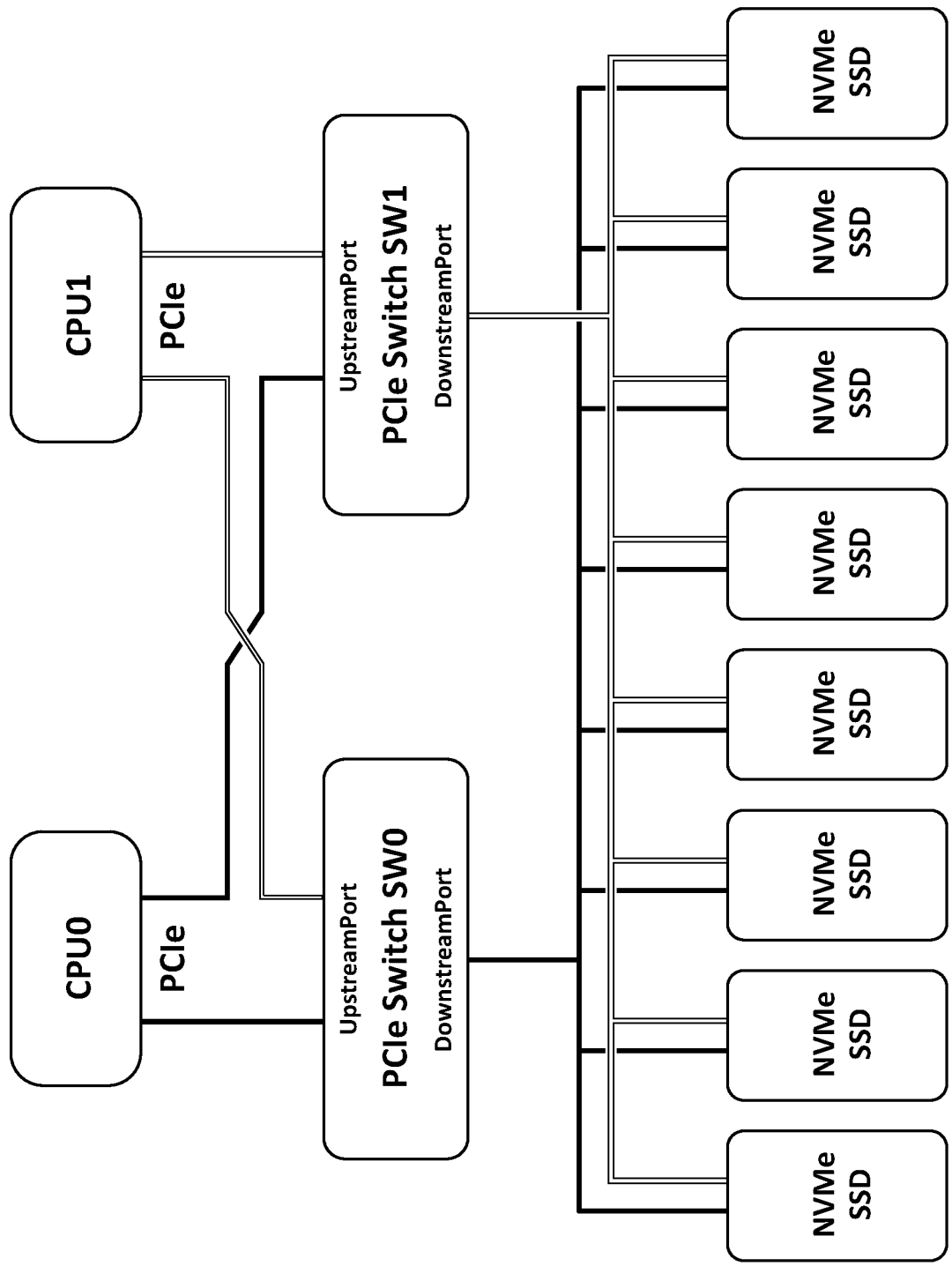
FIG. 2 is a simplified schematic diagram illustrating another basic topologies for connecting multiple CPUs and NVMe SSDs by way of PCIe switches with CPU level and switch level redundancy, according to some embodiments of the present disclosure.

Another application could apply to a switch arrangement where each switch in FIG. 2 is connected to a single CPU, i.e. connections between CPU0 and SW1 and between CPU1 and SW0 would not exist. In case that large amount of cold data, i.e. data that are rarely accessed, needs to be transported from CPU0 to CPU1, e.g. when a new node is added into the current distributed storage network, copies of user data need to be delivered from the current nodes to this new node. The traditional solution would involve a communication network between the two CPUs CPU0, CPU1, resulting in a heavy traffic load. With aforedescribed exemplary design illustrated for example in FIG. 3, CPU0 could first clone of all the required data onto one NVMe SSD and thereafter migrate this NVMe SSD to CPU1 as a whole. In other words, the inner-CPU bandwidth (making a clone SSD within one node) is utilized, thus saving inter-CPU network bandwidth cost.

The operation during hot-add of a NVMe SSD will now be described with reference to a process flow chart shown in FIG. 6.

FPGA and Switch Initialization

Before any hot-swap, the system must be powered on and the firmware loaded. The FPGA will disable all I2C GPIO expander interfaces between switches SW0, SW1 and the NVMe SSDs before the NVMe SSDs can be successfully detected and configured.

The switches SW0, SW1 need to enable the dynamic bifurcation and dynamic partition feature during initialization. A switch should also reserve a sufficient number of logic P2P (PCIe-to-PCIe) bridges for the physical downstream (DS) ports. For each stack, all the DS ports would then be configured in x2 granularity. A 2 x2 port could be combined to work as a 1 x4 port through a configuration command as the policy is distributed downwards. During enumeration, each logic P2P bridge will be assigned its own primary/secondary/subordinate bus number. This is task of the root complex which connects the processor and memory subsystem to the PCI Express switch fabric composed of one or more switch devices.

For a cascaded switch similar to the arrangement of Topology (c) in FIG. 1, the top level SW's execute enumeration. In the context of this disclosure, the disclosed process relates only to the bottom switches that directly interface with the NVMe SSDs.

Surprise SSD Hot-Add

Figure 6:
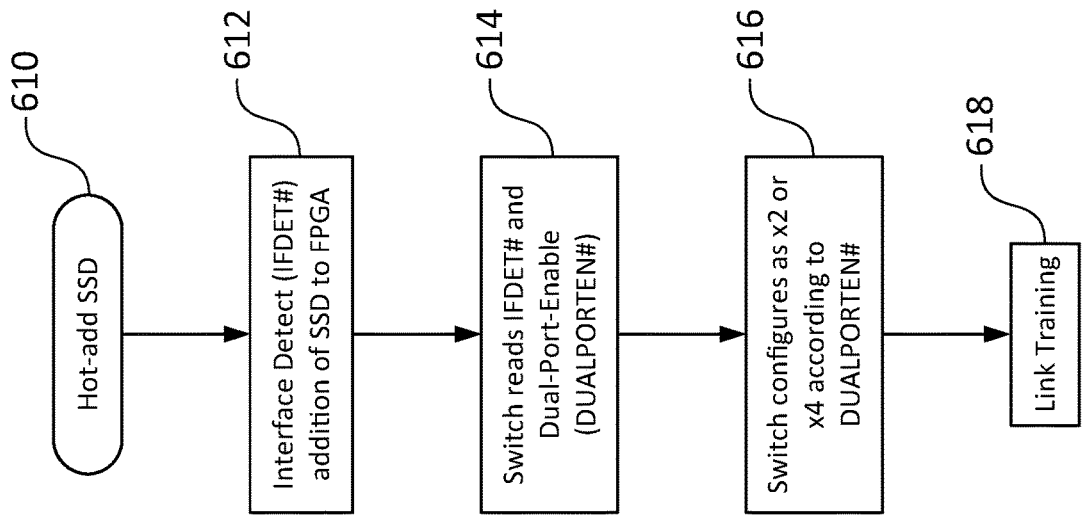
FIG. 6 shows schematically a process flow for hot-adding a NVMe SSD.

FIG. 6 shows schematically a process 600 for hot adding an NVMe SSD. The process 600 starts at 610. The FPGA is first to sense the toggle of IFDET # indicating a new inserted NVMe SSD, at 612. Triggered by this toggle, the FPGA will then poll the SSD E2PROM content and report the content to the Management Platform.

Typically, users will assign one specific application policy for this SSD via the Management Platform, with the Management Platform delivering the latest policy to FPGA. This may be a default configuration policy or a configuration policy updated for example by a user in response to an application update.

The FPGA needs to configure all the MUX devices in FIGS. 3 and 4 according to the policy. The I2C GPIO expander interface will only be enabled after all the configurations have been successfully executed.

At 614, the switch reads the asserted IFDET # and the DUALPORTEN # of the SSD. The switch will then configure the bifurcation as x2, as in the example of FIG. 3, or as x4, as in the example of FIG. 4, commensurate with the DUALPORTEN # signal status, at step 616. Thereafter, at 618, the switch powers the SSD on, de-asserts PERST #, and initiates the PCIe link training procedure to enter the normal operating mode.

Surprise SSD Hot-Remove

Figure 7:
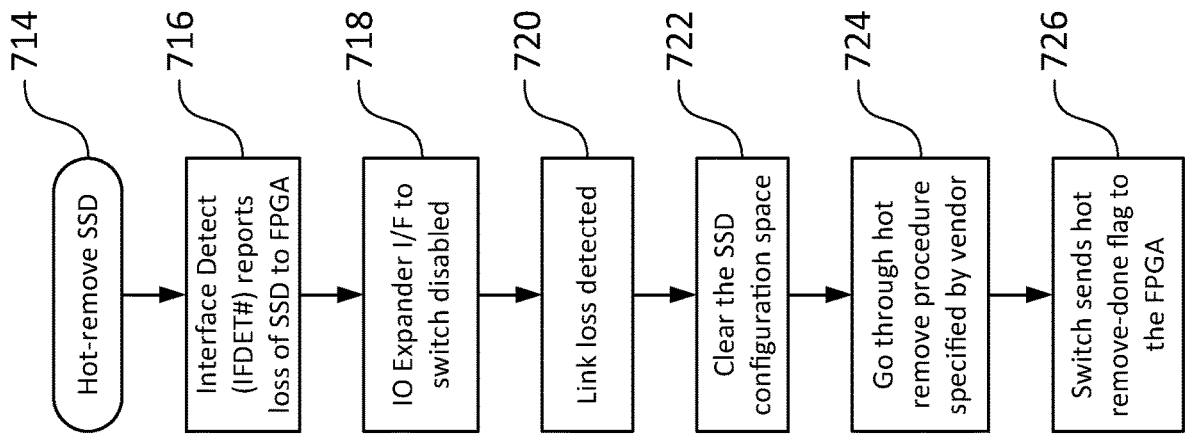
FIG. 7 shows schematically a process flow for hot-remove of a NVMe SSD.

FIG. 7 illustrates a process 800 for a surprise SSD hot remove. When SSD remove is initiated, at step 714, the loss of the de-asserted IFDET # signal is reported to the FPGA, at 716, which will automatically disable the I2C GPIO expander interface to the switch, at 718. Detection of the link loss, at 720, will clear the SSD configuration space, at 722, whereafter the complete hot-remove procedure specified by the vendor of the SSD can be performed, at 724. Hot remove may also be triggered by the loss of a PCIe link. When the hot-remove process is concluded, the switch sends a hot-remove-done flag to the FPGA, at 726.

Dynamic Modification of a SSD Configuration Policy

Figure 8:
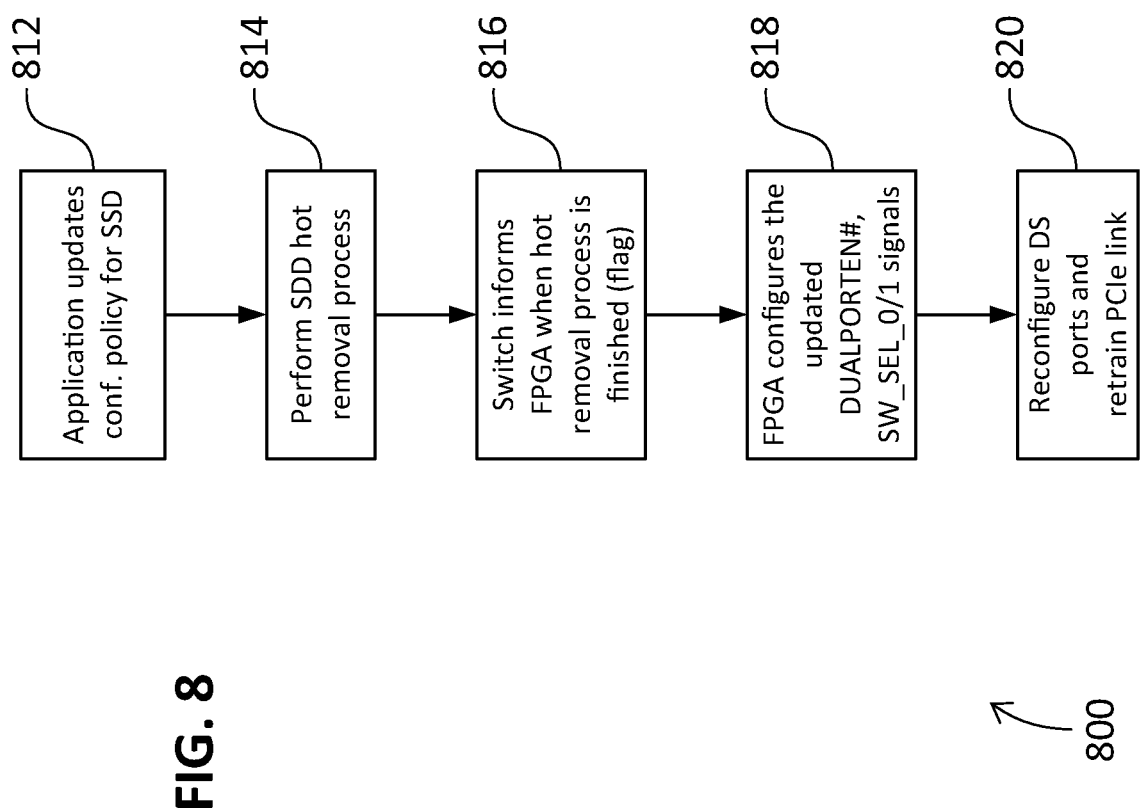
FIG. 8 shows schematically a process flow for dynamic modification of a SSD configuration policy.

The SSD configuration policy may be modified on-the-fly according to a changed application requirement. The associated process 800 will now be described with reference to the flow diagram in FIG. 8.

At 812, the configuration policy for the SSD is updated based on an application update. Specifically, this is done by performing at least some of the steps of the hot-remove process described in FIG. 7 (see process 700 in FIG. 7), although the NVMe SSD will actually not have to be removed physically, meaning that the PCIe link may still be active. The switch then informs the FPGA when the hot remove process is finished, at 816, and sets a flag. In one example, the switch may activate a blinking light (not shown) during the hot-remove process and then stop blinking when the hot-remove process is terminated. Details of the hot-remove process are not part of this disclosure and are typically specified by the vendor of the switch. The FPGA will configure the updated DUALPORTEN # and the SW_SEL_0/1 signals according to the new policy (see Table 1) after receiving the hot-remove-done signal, at 818. When the reconfiguration is done, FPGA will assert a FPGA_

CONFG_DONE signal. The switch can then re-bifurcate its downstream ports and re-train the PCIe link, at 820. The process 800 does not need to be performed when a SSD is hot-added (see process 600 in FIG. 6).

The disclosed embodiments represent a consolidated solution to flexibly and dynamically modify the connection between NVMe SSD and PCIe switch in x2-port granularity on-the-fly. According to some embodiments of the disclosure, one NVMe SSD may be connected to either a single switch in one x4-port mode/two x2-port mode, or to two switches in x2-port mode. These different connections scenarios may then be swapped dynamically without requiring administrator intervention.

This flexibility is implemented by swapping NVMe SSD work mode (between dual-port and single-port) and adapting the switches' downstream partition policy sequentially based on specific timing requirement.

With this flexibility, the virtualization stack now obtains one more degree of freedom to schedule its I/O traffic in a more balanced and efficient way. Besides that, the switch level redundancy is natively realized in single-port mode without the cost of I/O performance loss due to dual-port operation.

In summary, these exemplary embodiments may provide at least the following advantages:
a) Increased flexibility by supporting variant policy-based application-oriented storage I/O operations.
b) Improved performance by dynamically balancing I/O traffic between switches.
c) Improved reliability by providing switch level redundancy.
d) Reducing inter-CPU traffic load by cloning required data from one CPU onto one NVMe SSD and thereafter migrating these data from the NVMe SSD to another CPU.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

It should also be emphasized that although certain features are listed individually in the appended dependent claims, the features may be combined with one another in a single embodiment, unless specifically excluded or logically impossible.

What is claimed is:

1. An apparatus comprising:
at least one Peripheral Component Interconnect Express (PCIe) switch having an input port operatively connected to a respective CPU and at least one output port; and
at least one multiplexer connected between the at least one output port of the at least one PCIe switch and a PCIe disk array, the at least one multiplexer configured to alternate a connection of the PCIe disk array between a first configuration and a second configuration in response to a change in a configuration policy, a surprise addition without notification, or a surprise removal without notification, the first configuration being the at least one multiplexer connected to a single PCIe switch in one x4 port mode or two x2 port mode, the second configuration being the at least one multiplexer connected to two PCIe switches in x2 port mode, the at least one multiplexer configured to dynamically affect a switch-over between the first configuration and the second configuration.

2. The apparatus of claim 1, wherein,
the switch-over occurs in response to the change in the configuration policy,
and
the configuration policy is of the PCIe disk array.

3. The apparatus of claim 1, wherein,
the switch-over occurs in response to the surprise addition without the notification, and
the surprise addition is of a PCIe disk array (hot-add).

4. The apparatus of claim 1,
wherein,
the switch-over occurs in response to the surprise removal without the notification, and
the surprise removal is of a PCIe disk array (hot-remove).

5. The apparatus of claim 1, wherein when data traffic congestion is detected at a first PCIe switch, the at least one multiplexer is configured to redirect a portion of data traffic from the first PCIe switch to a second PCIe switch for transmission to/from the PCIe disk array.

6. The apparatus of claim 1, wherein when operating in x4 port mode, the at least one multiplexer is configured to migrate all data traffic from a first PCIe switch to a second PCIe switch upon detection of a failure of the first PCIe switch for transmission to/from the PCIe disk array.

7. The apparatus of claim 1, wherein the PCIe disk array comprises a Non-Volatile Memory Express Solid-State Drive (NVMe SSD).

8. The apparatus of claim 1, further comprising:
a control logic device operatively connected to at least one PCIe switch and the at least one multiplexer and configured to monitor PCIe disk array information and PCIe disk configuration policy execution.

9. The apparatus of claim 8, wherein the control logic device is connected for communication to a management platform, with the management platform managing policy for the control logic device.

10. A method for partitioning a Peripheral Component Interconnect Express (PCIe) disk array, the method comprising:
connecting at least one multiplexer between the PCIe disk array and at least one output port of at least one PCIe switch, the at least one multiplexer configured to alternate a connection of the PCIe disk array between a first configuration and a second configuration in response to a change in a configuration policy or a surprise addition/removal without notification, the first configuration being the at least one multiplexer connected to a single PCIe switch in one x4 port mode or in two x2 port mode, the second configuration being the at least one multiplexer connected to two PCIe switches in x2 port mode, and
dynamically switching with the at least one multiplexer between the first configuration and the second configuration in response to the change.

11. The method of claim 10, wherein the PCIe disk array comprises a Non-Volatile Memory Express Solid-State Drive (NVMe SSD).

12. The method of claim 10,
wherein,
the dynamically switching between the first configuration and the second configuration takes place responsive to the surprise addition without the notification and/or the surprise removal without the notification,
the surprise addition is of a PCIe disk array (hot-add), and
the surprise removal is of a PCIe disk array (hot-remove).

13. The method of claim 10,
wherein,
the dynamically switching between the first configuration and the second configuration takes place responsive to the change in the configuration policy, and
the change in the configuration policy is of the PCIe disk array.

14. The method of claim 10, further comprising:
when data traffic congestion is detected at a first PCIe switch, redirecting a portion of the data traffic from the first PCIe switch to a second PCIe switch for transmission to/from the PCIe disk array.

15. The method of claim 10, further comprising:
when operating in x4 port mode, migrating all data traffic to a second PCIe switch upon detection of a failure of a first PCIe switch for transmission to/from the PCIe disk array.

16. The method of claim 10, wherein the dynamically switching includes managing, with a control logic device operatively connected to at least one PCIe switch and the at least one multiplexer, information of the PCIe disk array and status information of the at least one multiplexer.

17. A computer program embodied in a non-transitory computer-readable medium and comprising program instructions which, when loaded into a computer memory and executed by a processor, causes the processor to:
switch at least one multiplexer connected between a Peripheral Component Interconnect Express (PCIe) disk array and one or more output ports of one or more PCIe switches between a first configuration and a second configuration, the at least one multiplexer connecting the PCIe disk array in the first configuration to an output port of a single PCIe switch in one x4 port mode or in two x2 port mode, or in the second configuration to output ports of two PCIe switches in x2 port mode,
wherein the at least one multiplexer is dynamically switched between the first configuration and the second configuration in response to a change in a configuration policy, a surprise addition without notification, or a surprise removal without notification.

18. The computer program of claim 17,
wherein,
dynamically switching takes place responsive to the surprise addition without the notification or the surprise removal without the notification,
the surprise addition being of a PCIe disk array (hot-add), and
the surprise removal being of a PCIe disk array (hot-remove).

19. The computer program of claim 17, wherein the computer program causes a control logic device to communicate status information of the PCIe disk array and the at least one multiplexer.

* * * * *